US010725261B2

(12) United States Patent
Kobayashi et al.

(10) Patent No.: US 10,725,261 B2
(45) Date of Patent: Jul. 28, 2020

(54) OPTICAL FIBER-CABLE BRANCH MEMBER AND OPTICAL FIBER-CABLE BRANCH STRUCTURE

(71) Applicant: FUJIKURA LTD., Tokyo (JP)

(72) Inventors: Terutake Kobayashi, Sakura (JP); Norihiro Momotsu, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 15/774,219

(22) PCT Filed: May 31, 2016

(86) PCT No.: PCT/JP2016/066002
§ 371 (c)(1),
(2) Date: May 7, 2018

(87) PCT Pub. No.: WO2017/110114
PCT Pub. Date: Jun. 29, 2017

(65) Prior Publication Data
US 2018/0329167 A1    Nov. 15, 2018

(30) Foreign Application Priority Data

Dec. 25, 2015  (JP) .................................. 2015-254838

(51) Int. Cl.
*G02B 6/44*  (2006.01)
*G02B 6/40*  (2006.01)
*G02B 6/38*  (2006.01)

(52) U.S. Cl.
CPC ........... *G02B 6/4495* (2013.01); *G02B 6/443* (2013.01); *G02B 6/3887* (2013.01); *G02B 6/406* (2013.01); *G02B 6/441* (2013.01)

(58) Field of Classification Search
CPC ...... G02B 6/4495; G02B 6/443; G02B 6/441; G02B 6/44; G02B 6/46; G02B 6/406;
(Continued)

(56) References Cited

U.S. PATENT DOCUMENTS 5,416,881 A * 5/1995 Ikeda .................... G02B 6/2804
385/132
5,835,652 A * 11/1998 Yagi et al. ............... G02B 6/38
385/87
(Continued)

FOREIGN PATENT DOCUMENTS

JP    H10-197742 A    7/1998
JP    2005-292551 A    10/2005
(Continued)

OTHER PUBLICATIONS

Office Action in counterpart Japanese Patent Application No. 2017-557723 dated Feb. 12, 2019 (8 pages).

*Primary Examiner* — Ryan A Lepisto
*Assistant Examiner* — Erin D Chiem
(74) *Attorney, Agent, or Firm* — Osha Liang LLP

(57) ABSTRACT

An optical fiber-cable branch member includes: a branch member main body; a cable fixing portion that holds and fixes an end portion of a jacket of an optical fiber-cable onto the branch member main body; and a tube fixing portion that fixes a plurality of protective tubes onto the branch member main body. The optical fiber-cable includes a first optical fiber core bundle and the jacket, and the jacket coats an outer circumference of the first optical fiber core bundle and includes a tension-resisting member buried in a cable longitudinal direction. The plurality of protective tubes cover and protect respective outer circumferences of a plurality of second optical fiber core bundles obtained by branching the first optical fiber core bundle extending from the end portion of the jacket.

13 Claims, 19 Drawing Sheets

(58) Field of Classification Search
CPC .. G02B 6/3887; H02G 15/103; H02G 15/117; H02G 15/113
See application file for complete search history.

(56) References Cited

U.S. PATENT DOCUMENTS

| | | | |
|---|---|---|---|
| 6,687,450 B1* | 2/2004 | Kempeneers | G02B 6/4472 |
| | | | 385/135 |
| 8,348,700 B1* | 1/2013 | Chiang | H01R 24/28 |
| | | | 439/607.08 |
| 9,705,266 B2* | 7/2017 | Chen | H01R 11/09 |
| 9,739,967 B2* | 8/2017 | Yoshikawa | G02B 6/4472 |
| 2011/0038586 A1 | 2/2011 | Keller | |
| 2015/0295394 A1 | 10/2015 | Byczkiewicz | |
| 2016/0041354 A1* | 2/2016 | Guenter | G02B 6/4432 |
| | | | 385/86 |

FOREIGN PATENT DOCUMENTS

| | | | |
|---|---|---|---|
| JP | 2008-096847 A | | 4/2008 |
| JP | 2008-116595 A | | 5/2008 |
| JP | 2012-088454 A | | 5/2012 |
| JP | 2014-126667 A | | 7/2014 |
| JP | 2014126667 A | * | 7/2014 |
| JP | 2015-108756 A | | 6/2015 |
| JP | 2015-215448 A | | 12/2015 |
| WO | 2013/065640 A1 | | 5/2013 |

* cited by examiner

OPTICAL FIBER-CABLE BRANCH MEMBER AND OPTICAL FIBER-CABLE BRANCH STRUCTURE

CROSS-REFERENCE TO RELATED APPLICATIONS

The present application claims priority to Japanese Patent Application No. 2015-254838 filed on Dec. 25, 2015, the content of which is incorporated herein by reference in its entirety.

TECHNICAL FIELD

The present disclosure relates to an optical fiber-cable branch member and an optical fiber-cable branch structure.

BACKGROUND

For example, a plurality of optical fibers extending from an optical fiber-cable is fusion-bonded to other optical fibers in a fusion tray to be connected and connected to a terminal device. Such an optical fiber-cable accommodates a large number of optical fibers. Therefore, for example, the optical fiber-cable is laid to a building where a terminal device is installed, and the optical fibers extending from the optical fiber-cable are branched in the building.

As an optical fiber-cable branch member which branches a plurality of optical fibers extending from an optical fiber-cable, conventionally, there has been a branch case which takes an optical fiber-cable in, branches a plurality of optical fibers extending from the optical fiber-cable, inserts the optical fibers into a hollow tube, and takes out the optical fibers from a take-out port (for example, refer to Patent Document 1) This branch case has an intake port and a plurality of optical fiber take-out ports, branches the optical fibers in the optical fiber-cable taken in from the intake port, and takes out the branched optical fibers from the plurality of take-out ports.

PATENT DOCUMENTS

[Patent Document 1] United States Patent Application, Publication No. 2015/0295394

However, in the branch case disclosed in Patent Document 1, it is difficult to maintain the optical fibers in a stable state. Therefore, it is necessary to accommodate a plurality of optical fibers or the like in the branch case in an unstable state. Therefore, workability in branching the optical fibers is low.

SUMMARY

One or more embodiments of the invention provide an optical fiber-cable branch member and an optical fiber-cable branch structure capable of suppressing a decrease in workability when optical fibers are branched.

An optical fiber-cable branch member according to one or more embodiments of the present invention includes: a branch member main body; a cable fixing portion which is configured to hold-fix, onto the branch member main body, an end portion of a jacket of an optical fiber-cable including a first optical fiber core bundle and the jacket which is configured to coat an outer circumference of the first optical fiber core bundle and has a tension-resisting member buried therein in a cable longitudinal direction; and a tube fixing portion which is configured to fix, onto the branch member main body, a plurality of protective tubes which is configured to respectively cover and protect respective outer circumferences of a plurality of second optical fiber core bundles obtained by branching the first optical fiber core bundle extending from the end portion of the jacket.

One or more embodiments of the invention include he tube fixing portion which is configured to fix a plurality of protective tubes which is configured to respectively cover and protect respective outer circumferences of the plurality of second optical fiber core bundles obtained by branching the first optical fiber core bundle. Therefore, by fixing the protective tubes to the tube fixing portion, the optical fiber cores can be brought into a stable state. Therefore, it is possible to limit a decrease in workability when optical fiber cores are branched.

An optical fiber-cable branch structure according to one or more embodiments of the present invention includes: an optical fiber-cable including a first optical fiber core bundle and a jacket which is configured to coat an outer circumference of the first optical fiber core bundle and has a tension-resisting member buried therein in a cable longitudinal direction; a first optical fiber-cable branch member which is configured to branch the first optical fiber core bundle extending from an end portion of the jacket into a plurality of second optical fiber core bundles; the plurality of second optical fiber core bundles branched by the first optical fiber-cable branch member; and a plurality of protective tubes which is configured to respectively cover and protect respective outer circumferences of the plurality of second optical fiber core bundles, in which the first optical fiber-cable branch member includes: a branch member main body; a cable fixing portion which is configured to hold-fix the end portion of the jacket of the optical fiber-cable onto the branch member main body; and a tube fixing portion which is configured to fix, onto the branch member main body, the plurality of protective tubes which is configured to protect the plurality of second optical fiber core bundles obtained by branching the first optical fiber core bundle.

According to one or more embodiments of the invention, the first cable branch member includes: the cable fixing portion which holds the end portion of the jacket of the optical fiber-cable and thereby fixes the optical fiber-cable; and the plurality of protective tubes which is configured to respectively cover and protect respective outer circumferences of the plurality of second optical fiber core bundles obtained by branching the first optical fiber core bundle. Therefore, by fixing the optical fiber-cable to the cable fixing portion and fixing the protective tube to the tube fixing portion, the optical fibers can be brought into a stable state. Therefore, it is possible to suppress a decrease in workability when optical fibers are branched.

An optical fiber-cable branch structure according to one or more embodiments of the present invention may further include a second optical fiber-cable branch member which is configured to branch at least one of the plurality of second optical fiber core bundles branched by the first optical fiber-cable branch member into a plurality of third optical fiber core bundles.

According to one or more embodiments, by inclusion of the second fiber-cable branch member which is configured to branch at least one of the plurality of second optical fiber core bundles into the plurality of third optical fiber core bundles, more of the plurality of second optical fiber core bundles can be branched.

In an optical fiber-cable branch structure according to one or more embodiments of the present invention, by using the protective tubes each having a perfectly circular cross section, the second optical fiber core bundles and the protective tubes covering the second optical fiber core bundles may be bendable in any direction perpendicular to a longitudinal direction of the protective tubes.

According to one or more embodiments, the protective tubes are perfectly circular. If the protective tubes are elliptical or ellipsoidal, it is difficult to bend the protective tubes in a direction with a large curvature, and a bending direction is restricted. In this respect, it is easy to bend the protective tubes in any direction perpendicular to a longitudinal direction because of perfectly circular cross sections of the protective tubes.

One or more embodiments of the present invention are directed to the optical fiber-cable branch structure, in which, in the optical fiber-cable, the first optical fiber core bundle is constituted by a plurality of optical fiber units as an aggregate of optical fiber cores obtained by bundling a plurality of optical fiber cores with a bundling member, and the first optical fiber-cable branch member may branch the first optical fiber core bundle into the plurality of second optical fiber core bundles each constituted by one or more of the optical fiber units for protection.

According to one or more embodiments, in the optical fiber-cable, the first optical fiber core bundle is constituted by a plurality of optical fiber units as an aggregate of optical fiber cores each obtained by bundling a plurality of optical fiber cores with a bundling member. The first optical fiber-cable branch member branches the first optical fiber core bundle into the plurality of second optical fiber core bundles each constituted by one or more of the optical fiber units for protection. Therefore, it is possible to securely protect a branched optical fiber unit.

One or more embodiments of the present invention are directed to the optical fiber-cable branch structure, in which the protective tubes are transparent or translucent, and the optical fiber unit accommodated in each of the protective tubes may be recognizable by the bundling member visually recognized through each of the protective tubes.

According to one or more embodiments, the optical fiber unit can be identified by the bundling member visually recognized through the transparent or translucent protective tube. Therefore, it is possible to easily and securely identify the optical fiber unit without removing the protective tube.

In the optical fiber-cable branch member according to one or more embodiments, the branch member main body includes a protective case which is configured to protect an optical fiber core disposed between the cable fixing portion and the tube fixing portion.

According to one or more embodiments, the branch member main body may further include a protective case which is configured to protect an optical fiber core disposed between the cable fixing portion and the tube fixing portion.

According to one or more embodiments, the branch member main body includes the protective case which is configured to protect an optical fiber core, and therefore damage to the optical fiber core can be prevented.

In the optical fiber-cable branch member according to one or more embodiments, in the protective case, by filling a resin material in an internal space in which the optical fiber core is disposed, movement of the optical fiber core in the protective case may be prevented.

According to one or more embodiments, by filling the resin material in an internal space in which the optical fiber core is disposed, movement of the optical fiber core in the protective case is prevented. Therefore, variations, entanglement, and the like of the optical fibers can be suppressed. In addition, movement of a plurality of optical fibers extending from an end portion of the optical fiber-cable can be suppressed.

One or more embodiments of the present invention are directed to the optical fiber-cable branch member, in which the protective case may have an injection hole into which the resin material is injected.

According to one or more embodiments, the injection hole of the resin material is formed. Therefore, the resin material can be easily filled in an accommodation portion.

One or more embodiments of the present invention are directed to the optical fiber-cable branch structure, in which the branch member main body may include a protective case which is configured to protect an optical fiber core disposed between the cable fixing portion and the tube fixing portion.

One or more embodiments of the invention include the protective case that is configured to protect an optical fiber core, and therefore damage to the optical fiber core can be prevented.

One or more embodiments of the present invention are directed to the optical fiber-cable branch structure, in which, in the protective case, by filling a resin material in an internal space in which the optical fiber core is disposed, movement of the optical fiber core in the protective case may be prevented.

According to one or more embodiments, by filling a resin material in an internal space in which the optical fiber core is disposed, movement of the optical fiber core in the protective case is prevented. Therefore, variations, entanglement, and the like of the optical fibers can be suppressed. In addition, movement of the plurality of optical fibers extending from an end portion of the optical fiber-cable can be suppressed.

One or more embodiments of the present invention are directed to the optical fiber-cable branch structure, in which the protective case may have an injection hole into which the resin material is injected.

According to one or more embodiments, the injection hole of the resin material is formed. Therefore, the resin material can be easily filled in an accommodation portion.

One or more embodiments of the present invention are directed to the optical fiber-cable branch member, in which the tube fixing portion may have a fixing groove into which each of the protective tubes is inserted for fixing.

According to one or more embodiments, the tube fixing portion has the fixing groove into which each of the protective tubes is inserted for fixing. Therefore, the protective tubes can be securely fixed.

One or more embodiments of the present invention are directed to the optical fiber-cable branch member, in which, in the fixing groove of the tube fixing portion, a protrusion which retains the protective tubes may be formed.

According to one or more embodiments, the protrusion that retains the protective tubes is formed in the fixing groove. Therefore, movement of the protective tubes can be prevented, and therefore the protective tubes can be securely fixed.

One or more embodiments of the present invention are directed to the optical fiber-cable branch structure, in which the tube fixing portion may have a fixing groove into which each of the protective tubes is inserted for fixing.

According to one or more embodiments, the tube fixing portion has the fixing groove into which each of the protective tubes is inserted for fixing. Therefore, the protective tubes can be securely fixed.

One or more embodiments of the present invention are directed to the optical fiber-cable branch structure, in which, in the fixing groove of the tube fixing portion, a protrusion which retains the protective tubes may be formed.

According to one or more embodiments, the protrusion which retains the protective tubes is formed in the fixing groove. Therefore, movement of the protective tubes can be prevented, and therefore the protective tubes can be securely fixed.

One or more embodiments of the present invention are directed to the optical fiber-cable branch structure, in which the structure may further include a shape retaining member inserted into each of the protective tubes.

According to the optical fiber-cable branch member and the optical fiber-cable branch structure according to one or more embodiments, by inclusion of a shape retaining member inserted into a protective tube fixed to a fixing portion, collapse of the protective tube is suppressed, and therefore the protective tube can be securely fixed.

According to the optical fiber-cable branch member and the optical fiber-cable branch structure of one or more embodiments, it is possible to suppress a decrease in workability when optical fibers are branched.

DETAILED DESCRIPTION

Figure 1A:
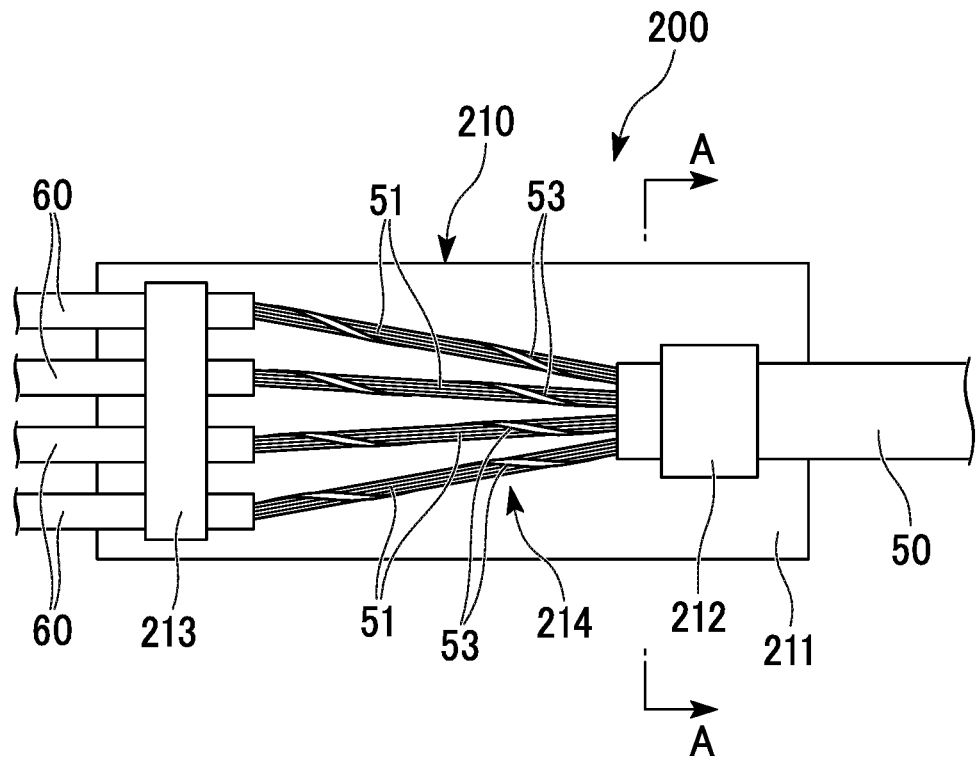
FIG. 1A is a side view of an optical fiber-cable branch structure according to one or more embodiments of the present invention.

Next, embodiments of the present invention will be shown based on the drawings. In the following embodiments, common elements, members, and the like are denoted by the same reference numerals, and a description thereof may be omitted.

Figure 1B:
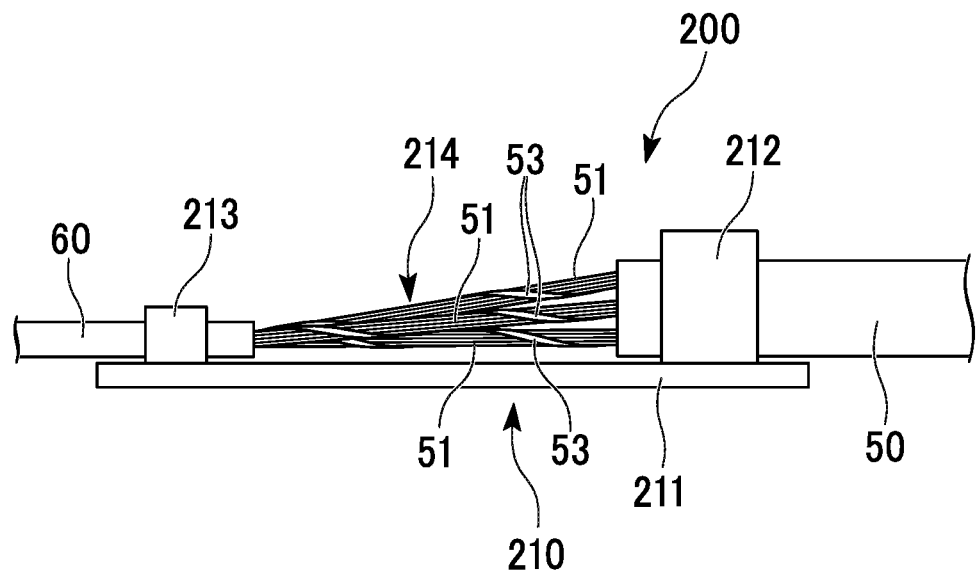
FIG. 1B is a plan view of an optical fiber-cable branch structure according to one or more embodiments of the present invention.

FIG. 1A is a side view of an optical fiber-cable branch structure according to one or more embodiments of the present invention. FIG. 1B is a plan view of an optical fiber-cable branch structure according to one or more embodiments of the present invention. As shown in FIGS. 1A and 1B, an optical fiber-cable branch structure 200 includes an optical fiber-cable branch member (first cable branch member) 210, an optical fiber-cable 50, and a protective tube 60.

The optical fiber-cable branch member 210 includes a branch member main body 211, a cable fixing portion 212, and a tube fixing portion 213. A branch portion 214 is formed between the cable fixing portion 212 and the tube fixing portion 213. The cable fixing portion 212 holds and fixes the optical fiber-cable 50.

Figure 13:
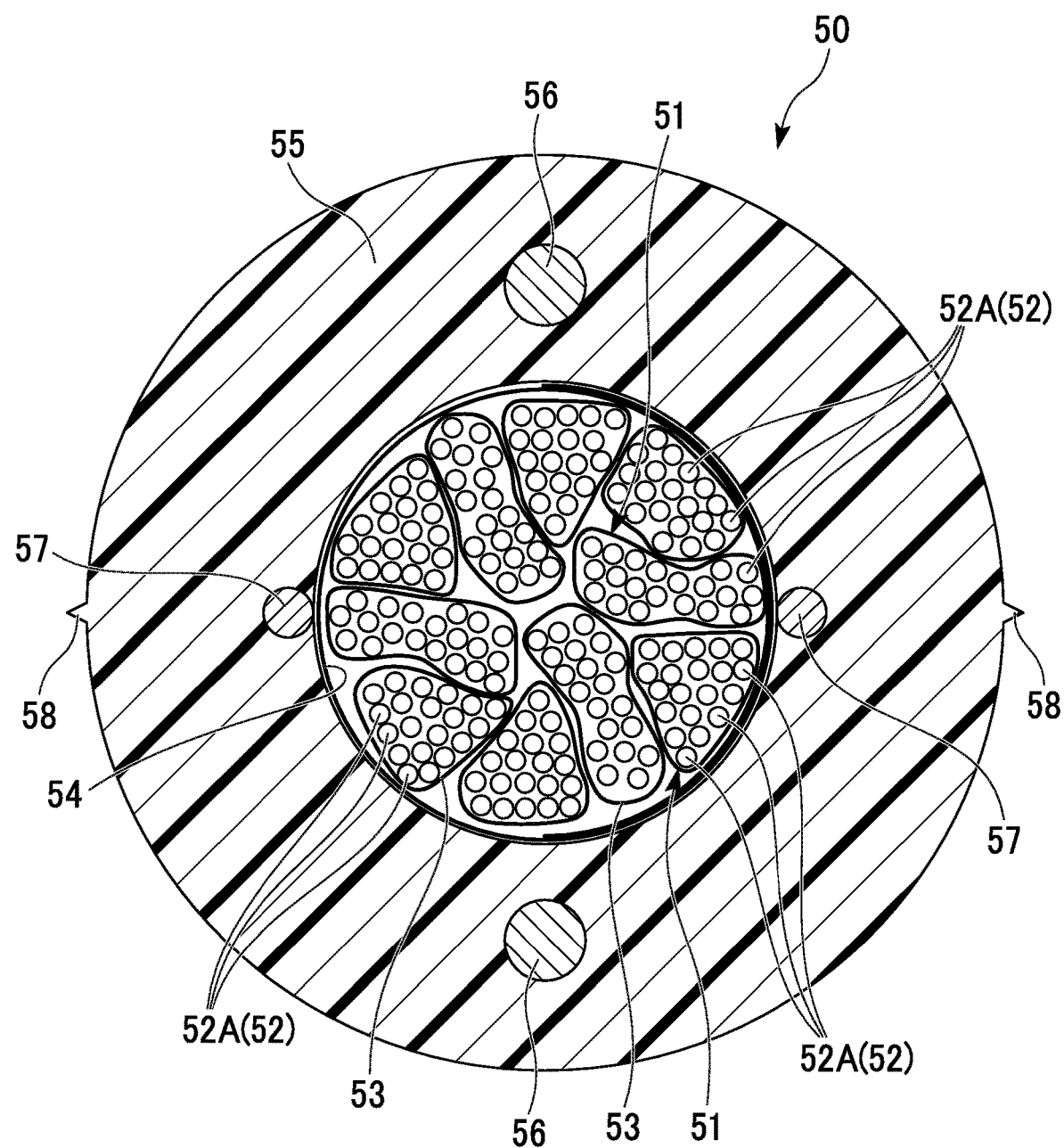
FIG. 13 is a cross-sectional view of an optical fiber-cable in accordance with one or more embodiments.
Figure 14A:
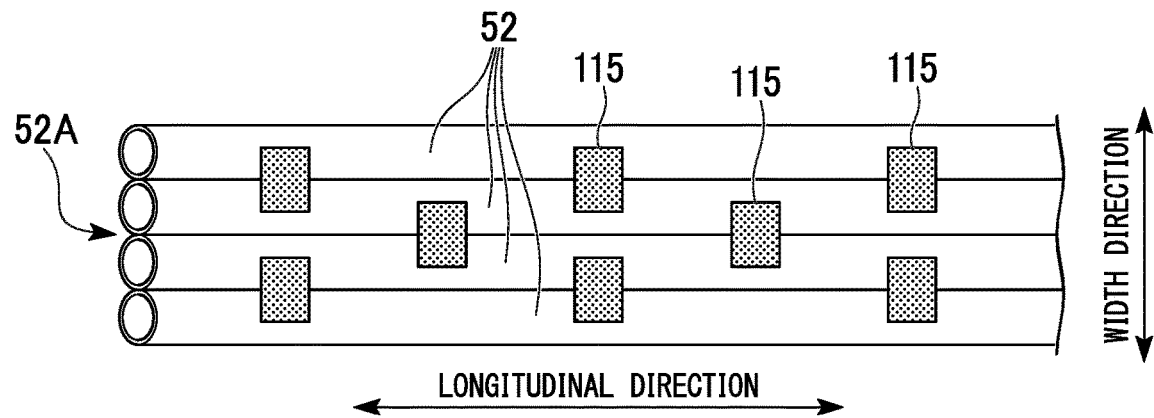
FIG. 14A is a schematic diagram of an intermittently-fixed core including four optical fibers in accordance with one or more embodiments.
Figure 14B:
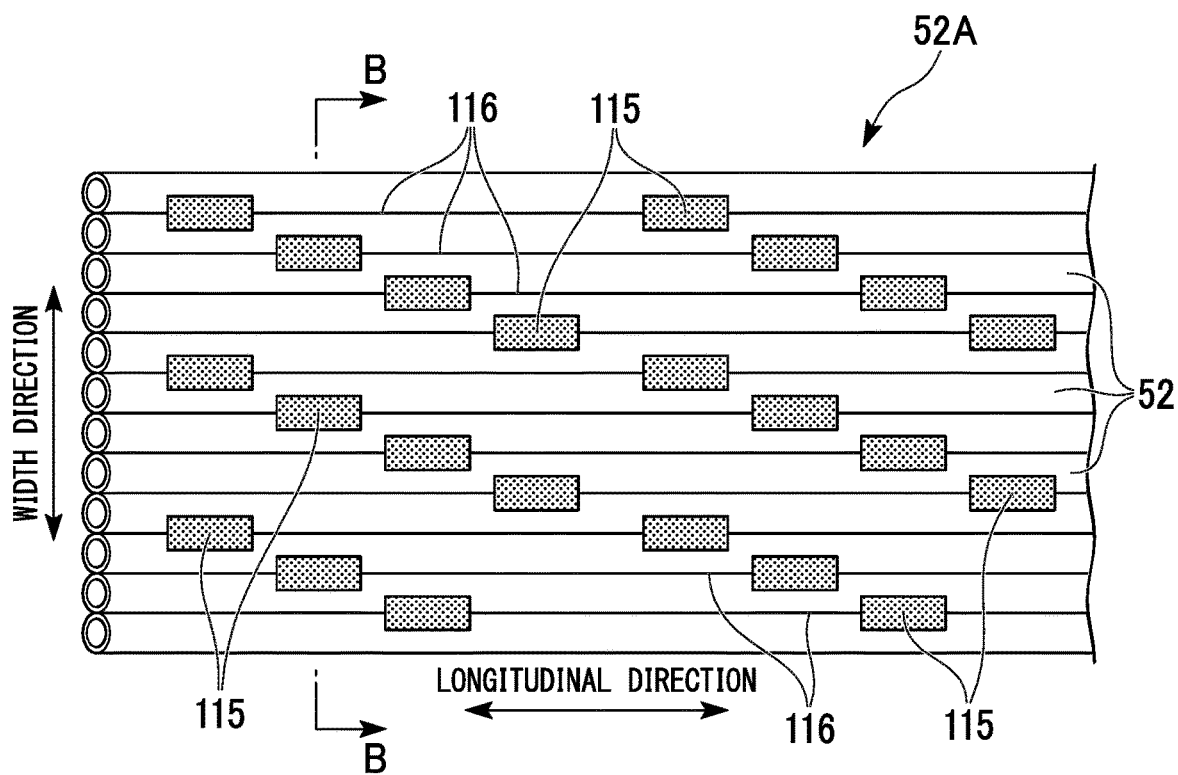
FIG. 14B is a schematic diagram of an intermittently-fixed core including 12 optical fibers in accordance with one or more embodiments.

As shown in FIG. 13, the optical fiber-cable 50 includes an optical fiber unit bundle (first optical fiber core bundle) 51A including a plurality of sets of (for example, ten sets of) optical fiber units 51. The optical fiber unit 51 includes one or more optical fibers (optical fiber cores) 52, and includes a plurality of (for example, about 100) optical fibers 52. As shown in FIGS. 14A and 14B, a certain number of optical fibers 52 form an intermittently-fixed core 52A. The intermittently-fixed core 52A has a tape shape and is formed by disposing the optical fibers 52 in a certain direction at equal pitches. The intermittently-fixed core 52A is called a spider web ribbon (SWR), and includes several (for example, four) optical fibers 52 as shown in FIG. 14A. Alternatively, the intermittently-fixed core 52A may include 12 optical fibers 52 as shown in FIG. 14B or may include a different number of optical fibers 52.

The intermittently-fixed core 52A shown in FIG. 14B will be further shown below. The intermittently-fixed core 52A is formed by arranging 12 optical fibers 52. Among these 12 optical fibers 52, adjacent optical fibers 52 are connected by connectors 115. The connectors 115 are disposed in a longitudinal direction of the optical fibers 52 (cable longitudinal direction) at regular intervals. With respect to a position of a connector 115 connecting adjacent optical fibers 52, a connector 115 connecting adjacent optical fibers 52 next to the adjacent optical fibers 52 is disposed at a position shifted in a longitudinal direction of the optical fibers 52. Similarly, a connector 115 connecting adjacent optical fibers 52 further next to the adjacent optical fibers 52 is disposed at a position shifted in the longitudinal direction of the optical fibers 52. In this manner, the connectors 115 are disposed in a stepwise manner in a width direction and the longitudinal direction.

In the intermittently-fixed core 52A including the four optical fibers 52 shown in FIG. 14A, adjacent optical fibers 52 are connected by the connectors 115. The connectors 115 are disposed in a longitudinal direction of the optical fibers 52 (cable longitudinal direction) at regular intervals. Therefore, the connectors 115 disposed in the intermittently-fixed core 52A including the four optical fibers 52 shown in FIG. 14A are disposed more densely than the connectors 115 disposed in the intermittently-fixed core 52A including the 12 optical fibers 52 shown in FIG. 14B. In other words, the connectors 115 disposed in the intermittently-fixed core 52A including the 12 optical fibers 52 shown in FIG. 14B are disposed more sparsely than the connectors 115 disposed in the intermittently-fixed core 52A including the four optical fibers 52 shown in FIG. 14A.

Figure 15A:
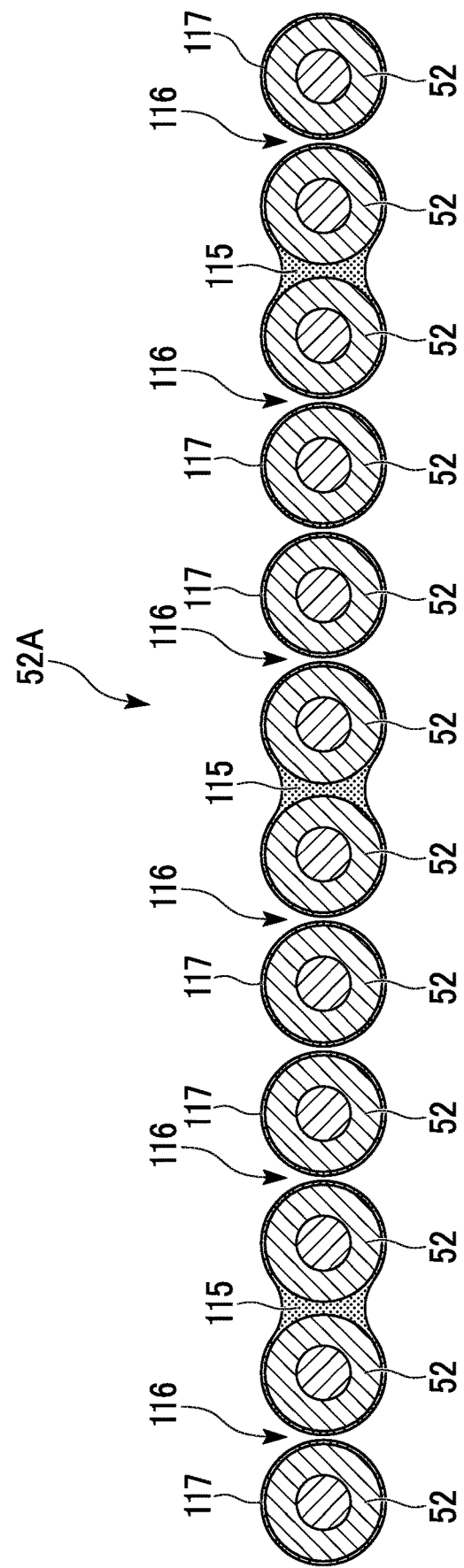
FIG. 15A is a cross-sectional view taken along line B-B of FIG. 14B.

As shown also in FIG. 15A, among adjacent optical fibers 52, adjacent optical fibers 52 connected by the connectors 115 are disposed with the connectors 115 sandwiched therebetween. Gap portions 116 are formed between adjacent optical fibers 52 other than the adjacent optical fibers 52 connected by the connectors 115. The widths of the connectors 115 and the gap portions 116 disposed between the adjacent optical fibers 52 are substantially equal. Therefore, the widths of the adjacent optical fibers 52 are substantially constant. The optical fibers 52 are covered with resin layers 117.

Figure 15B:
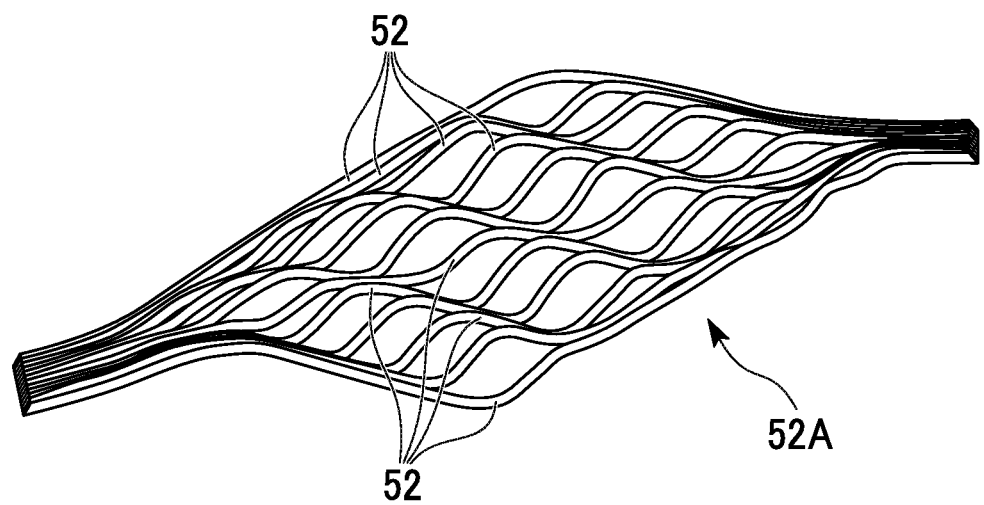
FIG. 15B is a diagram showing a state in which an intermittently-fixed core is spread in accordance with one or more embodiments.

In the intermittently-fixed core 52A, the adjacent optical fibers 52 are connected by the connectors 115 disposed in a stepwise manner in the width direction and the longitudinal direction. Therefore, the intermittently-fixed core 52A spreads like a net (like a spider web) as shown in FIG. 15B by being pulled from a longitudinal direction halfway position in a direction perpendicular to an extending direction thereof.

The optical fiber unit 51 is constituted by an aggregate of the optical fibers 52 obtained by bundling a predetermined number of intermittently-fixed cores 52A with a banding member (bundling member) 53. The banding members 53 are colored in different colors for the respective optical fiber units 51. Therefore, the optical fiber units 51 can be identified based on the colors of the banding members 53. As shown in FIG. 13, an optical fiber unit bundle 51A is wrapped by a wrapping tube 54 formed by a water absorption tape.

The optical fiber-cable 50 includes a jacket (outer cover) 55 and a tension-resisting member 56. The jacket 55 covers the wrapping tube 54 wrapping the optical fiber unit bundle 51A and coats the outer circumference of the optical fibers 52. The tension-resisting member 56 is disposed at a position adjacent to an inner side of the jacket 55. The tension-resisting members 56 are buried in a longitudinal direction of the optical fiber-cable 50. The tension-resisting members 56 are respectively buried at a 12 o'clock position located at an upper end and a six o'clock position located at a lower end as viewed in a cross section of the optical fiber-cable 50.

A ripping cord 57 is disposed at a position proximate to an internal surface of the jacket 55. The ripping cords 57 are disposed in an extending direction of the optical fiber-cable 50. The ripping cords 57 are respectively disposed at a three o'clock position located on the right side and a nine o'clock position located at the left side as viewed in a cross section of the optical fiber-cable 50. Ridged marker protrusions 58 are disposed on an outside of the positions in the jacket 55 where the ripping cords 57 are disposed. The marker protrusions 58 are formed along the ripping cords 57 and guide buried positions of the ripping cords 57. The ripping cords 57 or the marker protrusions 58 need not be disposed.

Figure 3:
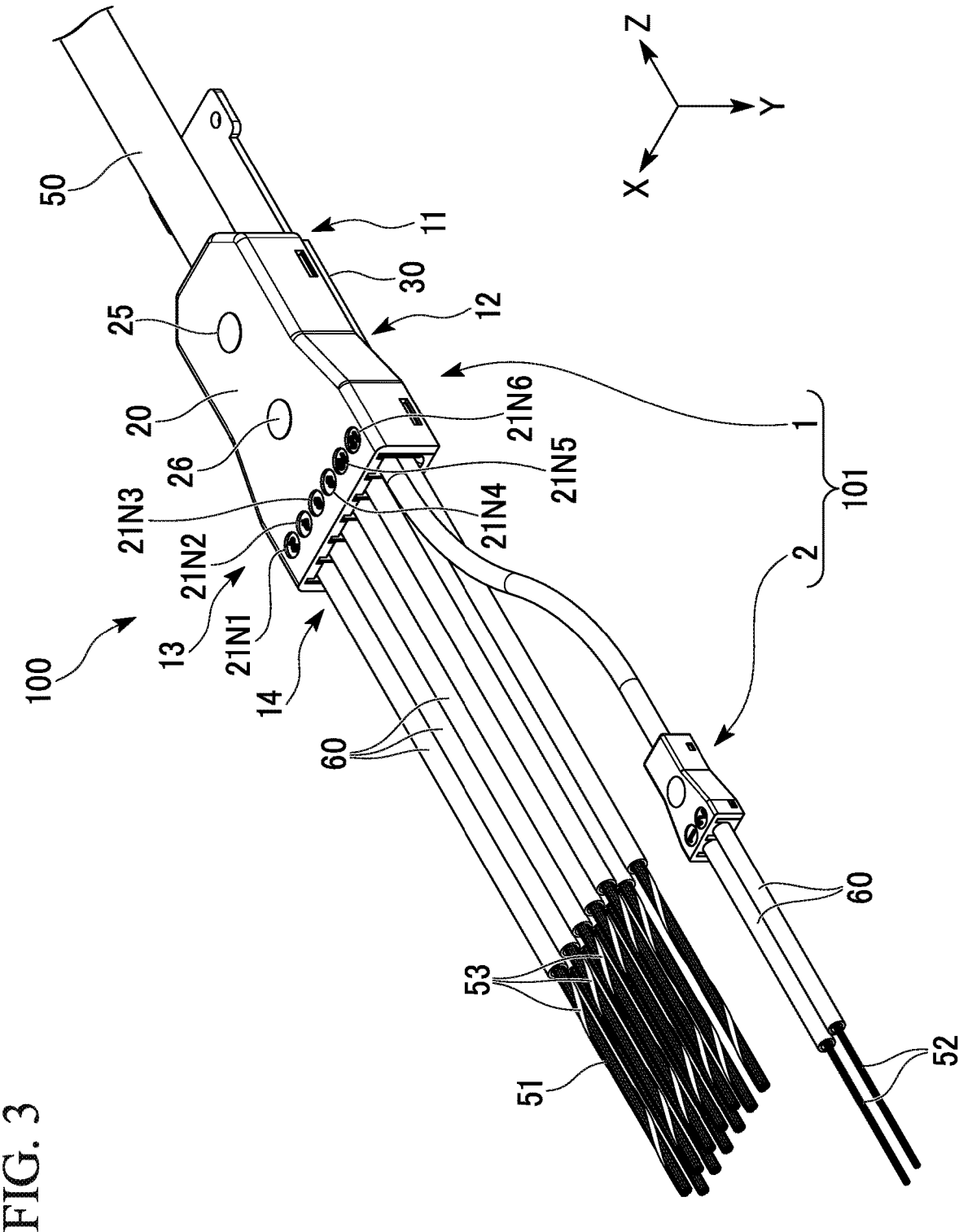
FIG. 3 is a perspective view of an optical fiber-cable branch structure according to one or more embodiments of the present invention.

As shown in FIGS. 1 and 3, the branch member main body 211 is a plate-shaped member. The branch member main body 211 is disposed for attaching the cable fixing portion 212 and the tube fixing portion 213. The branch member main body 211 is made of resin. A material of the branch member main body 211 is not limited and may be made of metal or the like.

Figure 2:
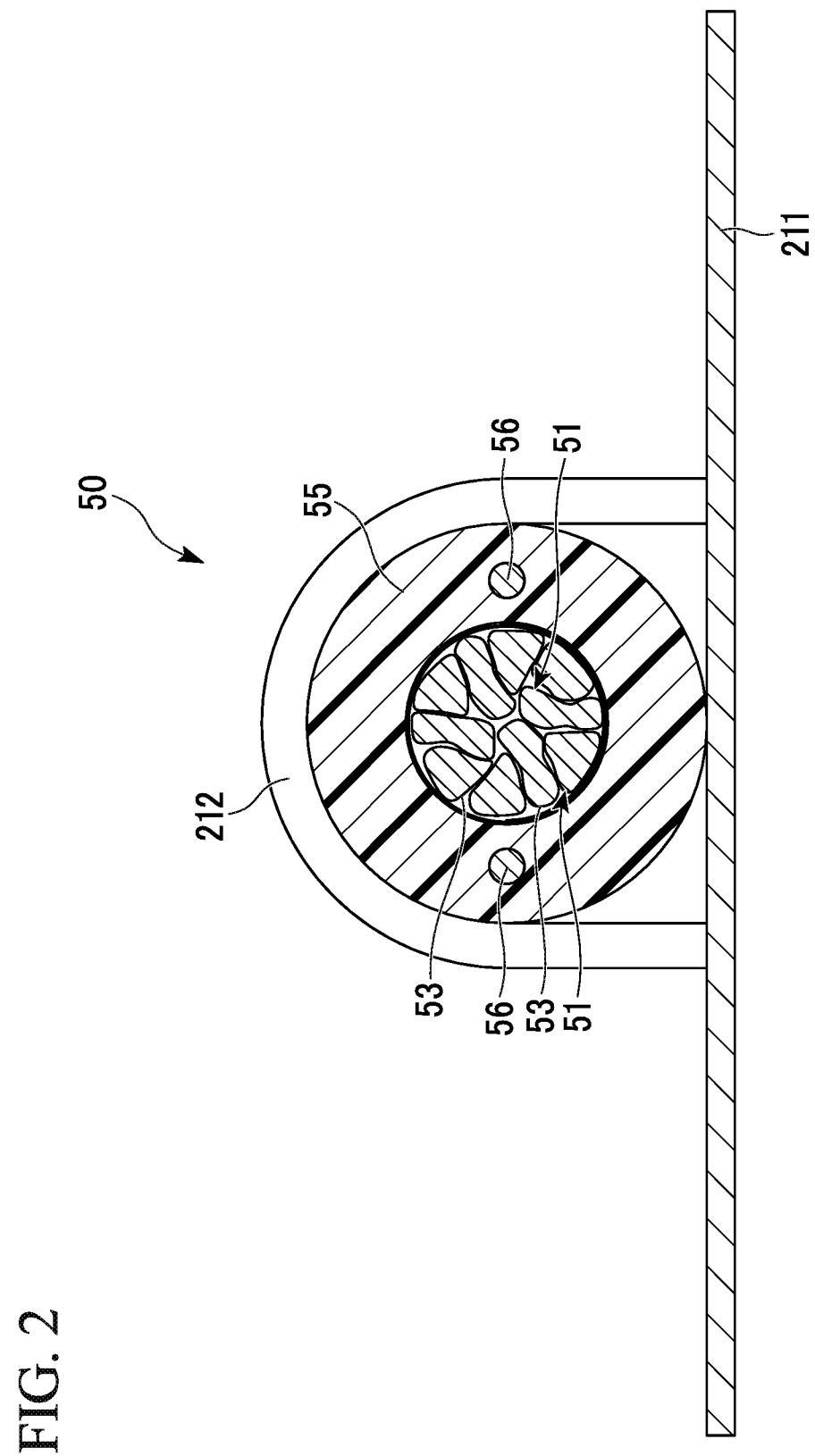
FIG. 2 is a cross-sectional view taken along line A-A of FIG. 1A.

As shown in FIG. 2, the two tension-resisting members 56 buried in the jacket 55 have a substantially equal distance from the branch member main body 211. In other words, a line segment connecting the tension-resisting members 56, obtainable when the two tension-resisting members 56 are cut along a cut plane perpendicular to a longitudinal direction of the optical fibers 52, is substantially parallel to a line (horizontal line) along a top surface of the branch member main body 211.

The cable fixing portion 212 is a metal half ring having a semicircular cross section which forms an arch shape having substantially the same diameter as the optical fiber-cable 50. The cable fixing portion 212 wraps the jacket 55 of the optical fiber-cable 50, and both end portions thereof are joined to the branch member main body 211 with screws (not shown) or the like. In this manner, the cable fixing portion 212 hold-fixes the end portion of the jacket 55 of the optical fiber-cable 50 onto the branch member main body 211.

A plurality of optical fiber unit bundles 51A extends from the end portion of the optical fiber-cable 50 fixed by the cable fixing portion 212. By branching these optical fiber unit bundles 51A in the branch portion 214, a plurality of optical fiber units (second optical fiber core bundles) 51 is obtained.

The protective tubes 60 respectively cover and protect respective outer circumferences of the optical fiber units 51 obtained by branching the optical fiber unit bundle 51A. The protective tube 60 has a perfectly circular cross section. The protective tube 60 is made of, for example, a resin and has flexibility, and is made of a white translucent material. However, the protective tube 60 may have another color such as black or white. Therefore, the optical fiber unit 51 accommodated in the protective tube 60 can be recognized by the banding member 53 visually recognized through the protective tube 60.

The tube fixing portion 213 is a metal half ring having a semicircular cross section which forms an arch shape having substantially the same diameter as the protective tube 60. The tube fixing portion 213 wraps the protective tubes 60, and both end portions thereof are joined to the branch member main body 211 with screws (not shown) or the like. In this manner, the tube fixing portion 213 holds the protective tubes 60 and is thereby fixed.

In the optical fiber-cable branch structure 200 according to one or more embodiments of the present invention having the above-shown configuration, the optical fiber-cable branch member 210 includes the tube fixing portion 213 which fixes the plurality of protective tubes 60 which respectively cover and protect respective outer circumference of the plurality of optical fiber units 51 to the branch member main body 211. By fixing the protective tubes 60 to the tube fixing portion 213, the optical fiber unit 51 and the optical fibers 52 can be brought into a stable state. Therefore, it is possible to suppress a decrease in workability when the optical fibers 52 are branched.

The optical fiber-cable branch member 210 includes the cable fixing portion 212 which hold-fixes an end portion of the jacket 55 onto the branch member main body 211. Therefore, the optical fiber unit 51 can be stably extended from the optical fiber-cable 50. In the optical fiber-cable 50, the tension-resisting members 56 are buried in the jacket 55. Here, for example, when the jacket 55 is fixed in a case where the tension-resisting members are disposed along an inner surface of the jacket, stability may be low when the optical fiber-cable 50 is fixed. In this respect, in the optical fiber-cable 50, the tension-resisting members 56 are disposed in the jacket 55. Therefore, the optical fiber-cable 50 can be stably fixed by fixing the jacket 55 with the cable fixing portion 212.

The protective tube 60 has a perfectly circular cross section. If the cross section of the protective tube is elliptical, ellipsoidal, rectangular, or the like, it is difficult to bend the protective tube in a direction with a large curvature or the like, and a bending direction of the protective tube is restricted. In this respect, the protective tube 60 has a perfectly circular cross section. Therefore, bending is easy in any direction perpendicular to a longitudinal direction of the protective tube 60.

The protective tube 60 accommodates and protects the optical fiber unit 51. The protective tube 60 is transparent or translucent. Therefore, it is possible to recognize the banding member 53 of the optical fiber unit 51 accommodated in the protective tube 60. Therefore, it is possible to easily and securely identify the optical fiber unit without removing the protective tube. Particularly, the banding members 53 are colored in colors different for the respective optical fiber units 51. Therefore, the optical fiber units 51 can be identified based on the colors of the banding members 53 from an outside of the protective tube 60.

The connectors 115 disposed in the intermittently-fixed core 52A including the 12 optical fibers 52 shown in FIG. 14B are disposed more sparsely than the connectors 115 disposed in the intermittently-fixed core 52A including the four optical fibers 52 shown in FIG. 14A. Therefore, the number of times the connectors 115 traverse the optical fibers 52 is reduced as viewed in a width direction. Therefore, the intermittently-fixed core 52A can be more flexible. Therefore, loss of cores caused when the intermittently-fixed core 52A is unbound into the optical fibers 52 can be reduced.

As shown in FIG. 2, the two tension-resisting members 56 buried in the jacket 55 of the optical fiber-cable 50 have a substantially the same distance from the branch member main body 211. Therefore, the optical fiber-cable 50 can be easily bendable in a direction perpendicular to a top surface of the branch member main body 211 (direction rotating around a horizontal line perpendicular to a cable longitudinal direction).

The tension-resisting members 56 are buried in the jacket 55. Therefore, the optical fiber-cable 50 can be fixed to the optical fiber-cable branch member 210 without regard to the disposition of the tension-resisting members 56. Therefore, workability in fixing the optical fiber-cable 50 to the optical fiber-cable branch member 210 can be enhanced, and this can contribute to a reduction in workload and shortening of working hours.

Figure 18:
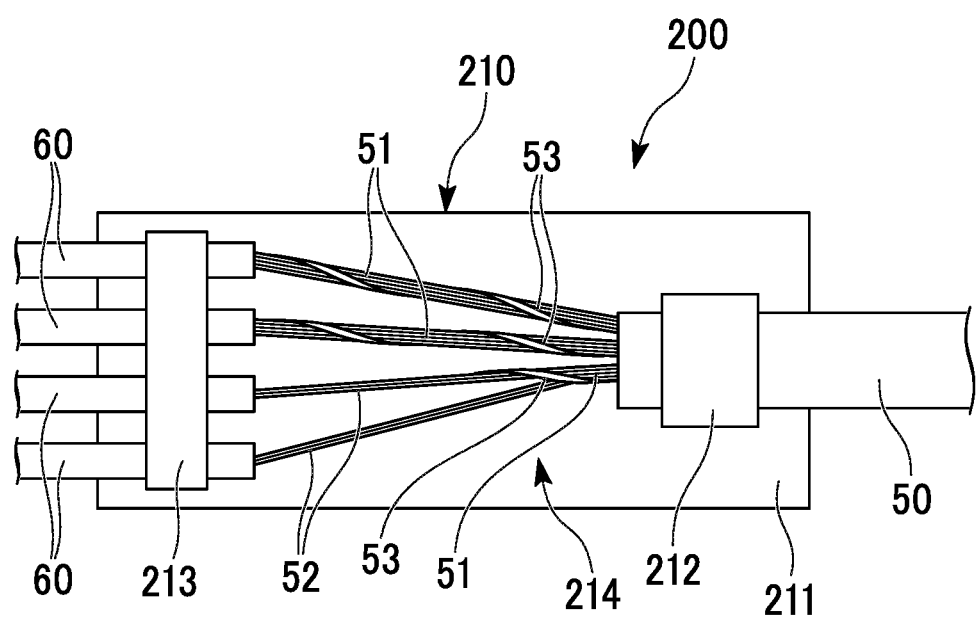
FIG. 18 is a plan view of an optical fiber-cable branch structure according to another example in one or more embodiments of the present invention.

A plurality of second optical fiber core bundles obtained by branching the plurality of optical fibers 52 (optical fiber unit bundles 51A) extending from an end portion of the jacket 55 are only required to include one or more optical fibers 52. In the above-shown example, the optical fiber core bundle corresponds to the optical fiber unit 51. However, the optical fiber core bundle may correspond to one optical fiber 52 obtained by unbinding the optical fiber unit 51 or one intermittently-fixed core 52A. Alternatively, as shown in FIG. 18, the optical fiber core bundle may correspond to the plurality of intermittently-fixed cores 52A or one optical fiber 52 obtained by unbinding the optical fiber unit 51. Alternatively, the optical fiber core bundle may correspond to a plurality of intermittently-fixed cores 52A or optical fibers 52 gathered from a plurality of optical fiber units 51.

The optical fiber-cable branch member 210 can be attached to an appropriate position to be used. For example, the optical fiber-cable branch member 210 can be connected to an optical termination box (optical junction box), a closure, a line terminator, a fusion tray, and the like. Here, in a case where the optical fiber-cable branch member 210 is attached to the optical termination box or the closure, the optical fiber-cable branch member 210 is often accommodated in a case or the like.

In this manner, in a state protected from an external environment, the optical fibers 52 disposed between the cable fixing portion 212 and the tube fixing portion 213 can be attached in a state protected from the external environment by a case or the like. Therefore, the optical fibers 52 disposed between the cable fixing portion 212 and the tube fixing portion 213 may be left exposed.

Figure 4:
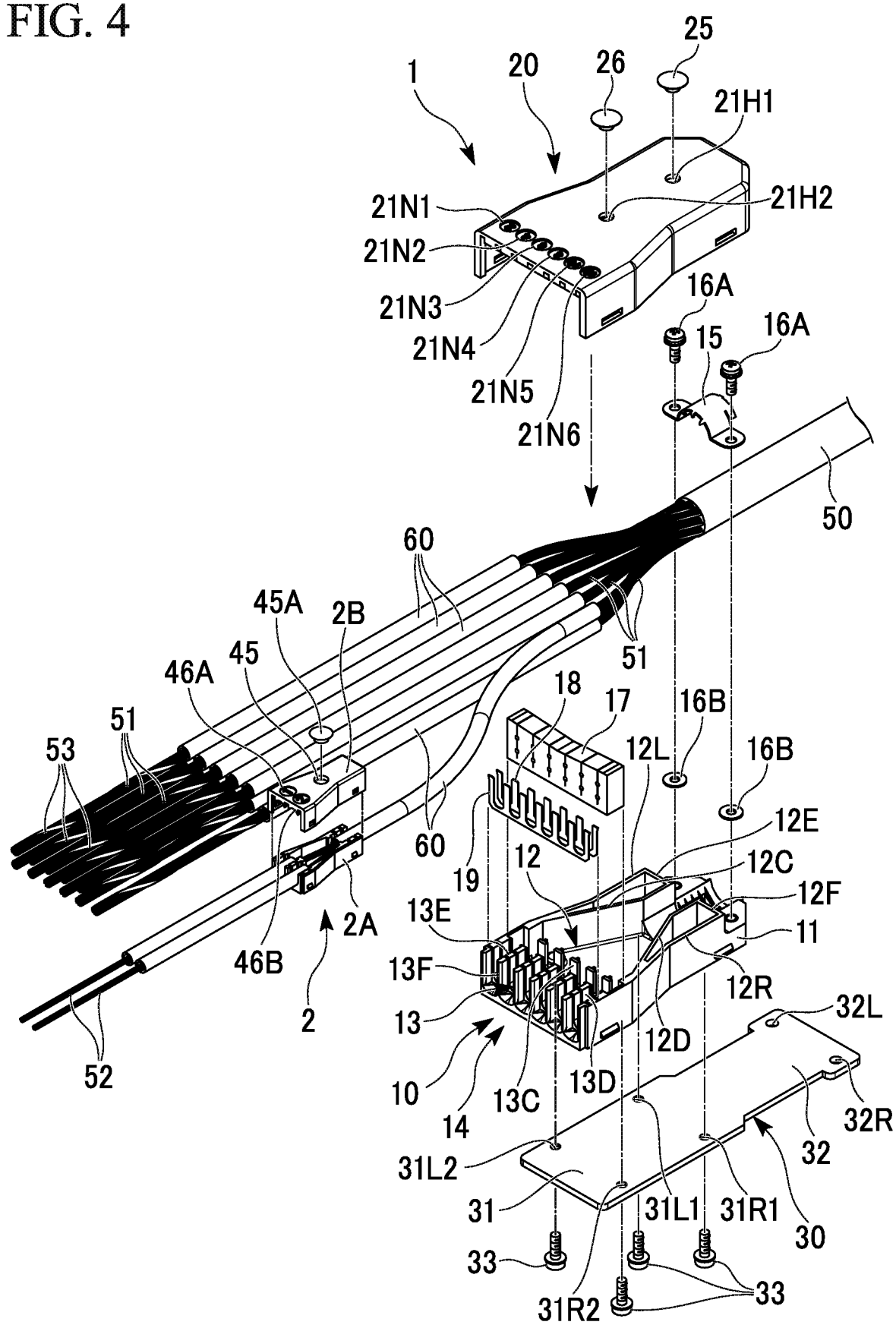
FIG. 4 is an exploded perspective view of an optical fiber-cable branch structure according to one or more embodiments of the present invention.

FIG. 3 is a perspective view of an optical fiber-cable branch structure according to one or more embodiments of the present invention. FIG. 4 is an exploded perspective view of the optical fiber-cable branch structure according to one or more embodiments of the present invention. In the following description, to make it easier to understand one or more embodiments of the invention, illustration in the drawings may be sometimes simplified by appropriately omitting part of components, simplifying the shapes, changing the sizes, and the like. A positional relationship of the components will be shown by setting an XYZ-orthogonal coordinate system. Members and the like common to those in one or more embodiments described above are denoted by the same reference signs, and description thereof may be omitted. A description will be given assuming that, in the XYZ-orthogonal coordinate system, an X direction is a left-right direction, a Y direction is a front-back direction, and a Z direction is an up-down direction. Therefore, the down direction (Z direction) corresponds to an extending direction of optical fibers.

As shown in FIG. 3, an optical fiber-cable branch structure 100 according to one or more embodiments of the present invention includes an optical fiber-cable branch member 101. The optical fiber-cable branch member 101 includes a first branch case (first fiber-cable branch member, protective case) 1 and a second branch case (second fiber-cable branch member, protective case) 2. An optical fiber-cable 50 is taken into the first branch case 1.

The first branch case 1 branches an optical fiber unit bundle 51A extending from the optical fiber-cable 50 into a plurality of sets, for example, twelve sets of optical fiber units 51. The optical fiber unit 51 branched by the first branch case 1 is taken out from the first branch case 1. The optical fiber unit 51 taken out from the first branch case 1 is covered with a protective tube 60.

The optical fiber unit 51 taken out from the first branch case 1 is taken into the second branch case 2. The second branch case 2 branches about 100 optical fibers 52 from each of which a banding member 53 has been removed for several sets of intermittently-fixed cores 52A (third optical fiber cores). The optical fibers 52 (intermittently-fixed core 52A in this case) branched by the second branch case 2 are covered with the protective tube 60, and the branched intermittently-fixed core 52A is taken out from the second branch case 2.

In the example shown in FIG. 3, the first branch case 1 and the second branch case 2 are disposed. However, only the first branch case 1 may be disposed without the second branch case 2 disposed. A third branch case which further branches the plurality of optical fibers branched by the second branch case 2 may be disposed. Furthermore, an (n+1) th branch case which further branches a plurality of optical fibers branched by the n-th branch case (n is an integer) may be disposed. The first branch case 1 branches the optical fiber unit 51 extending from the optical fiber-cable 50 but may unbind the optical fiber unit 51 and may branch the optical fibers 52 for a plurality of optical fibers 52 or a single optical fiber 52.

As shown in FIG. 4, the first branch case 1 includes a first branch case main body (branch member main body) 10, a first branch case lid member 20, and an attachment plate 30. The first branch case main body 10 is made of a plastic resin. In the first branch case lid member 20, the attachment plate 30 made of a flexible resin is made of a curable resin.

The first branch case main body 10 includes an intake portion 11, an accommodation portion 12, a fixing portion (tube fixing portion) 13, and a take-out portion 14. The accommodation portion 12 is disposed between the intake portion 11 and the take-out portion 14, and the fixing portion 13 is disposed between the accommodation portion and the take-out portion 14. The optical fiber-cable 50 is taken in from an intake port of the first branch case 1 and branched into a plurality of optical fibers 52 in the first branch case 1. The branched optical fibers 52 are taken out from a take-out port of the first branch case 1.

Figure 5:
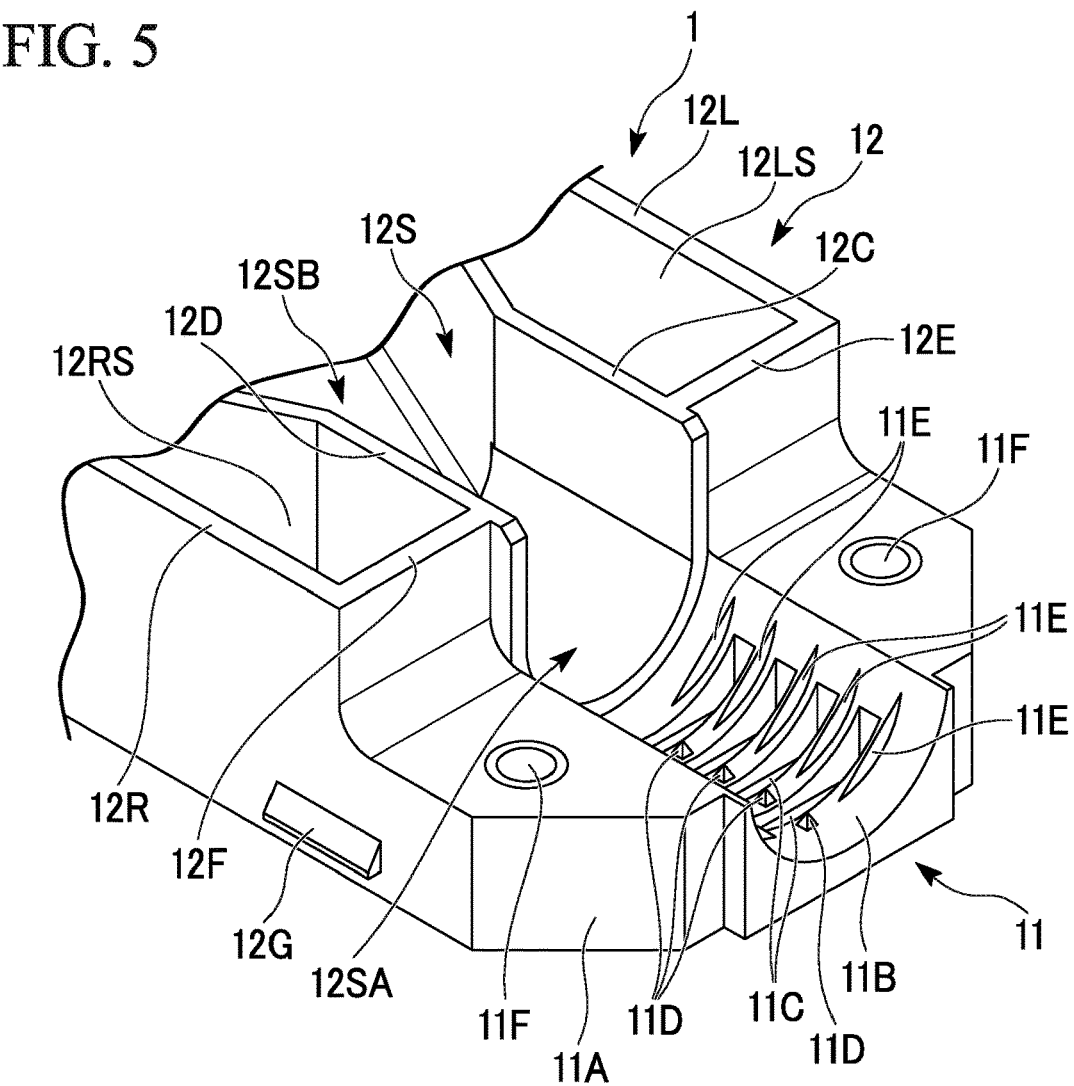
FIG. 5 is an enlarged perspective view of an intake port of a first branch case in accordance with one or more embodiments.

The intake portion 11 includes an intake portion main body 11A. As shown in FIG. 5, the intake portion main body 11A has a cable receiving recessed groove 11B having a substantially semicircular cross section recessed in a front-back direction (Y direction). The diameter of the cable receiving recessed groove 11B is substantially the same as the diameter of the jacket 55 of the optical fiber-cable 50, and the optical fiber-cable 50 is fitted into the cable receiving recessed groove 11B. In the cable receiving recessed groove 11B, cut portions 11C each having a rectangular shape as viewed from the front are formed at a plurality of positions, and the cut portions 11C are formed at four positions in an example shown in FIG. 5. The plurality of cut portions 11C is disposed apart from each other at substantially equal intervals in an extending direction of the optical fibers.

At positions adjacent to the plurality of cut portions 11C in the cable receiving recessed groove 11B, a rasp-cut protrusion 11D which is a square conical protrusion and a crescent-shaped protrusion 11E having a crescent shape in planar view are formed. The rasp-cut protrusions 11D are disposed apart from each other at equal intervals in an extending direction of the cable receiving recessed groove 11B and are respectively disposed above the plurality of respective cut portions 11C. The crescent-shaped protrusions 11E are formed at 10 positions in total, that is, at eight positions on left and right positions of the rasp-cut protrusion 11D and two positions on a lower side thereof. These crescent-shaped protrusions 11E are disposed apart from each other in pairs at equal intervals in an extending direction of the cable receiving recessed groove 11B. Thread grooves 11F are formed in left and right side positions of the intake portion main body 11A where the cable receiving recessed groove 11B is formed.

These cut portions 11C, rasp-cut protrusions 11D, and crescent-shaped protrusions 11E may be formed at other positions and in other numbers. It may be possible that any one of the cut portion 11C, the rasp-cut protrusion 11D, and the crescent-shaped protrusion 11E is not be formed, or that only a part thereof is formed.

Figure 6:
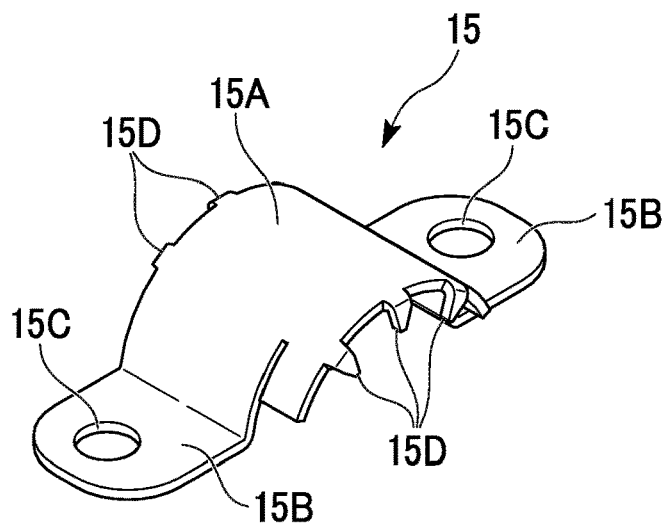
FIG. 6 is a perspective view of a holding member in accordance with one or more embodiments.

A holding member (cable fixing portion) 15 shown in FIGS. 4 and 6 is attached to the intake portion 11. The holding member 15 includes a holding member main body 15A. The holding member main body 15A is a metal half ring having a semicircular cross section which forms an arch shape having substantially the same diameter as the optical fiber-cable 50. Plate-like fastening portions 15B are respectively formed on both sides of the holding member main body 15A.

A through hole 15C is formed in the fastening portion 15B and is formed at a position corresponding to the thread groove 11F formed in the intake portion 11. The through hole 15C is aligned with the thread groove 11F of the intake portion 11. A screw 16A is screwed into the thread groove 11F from the front (Y direction), and the fastening portion 15B is fixed to the intake portion main body 11A of the intake portion 11 by the screw 16A.

Figure 7:
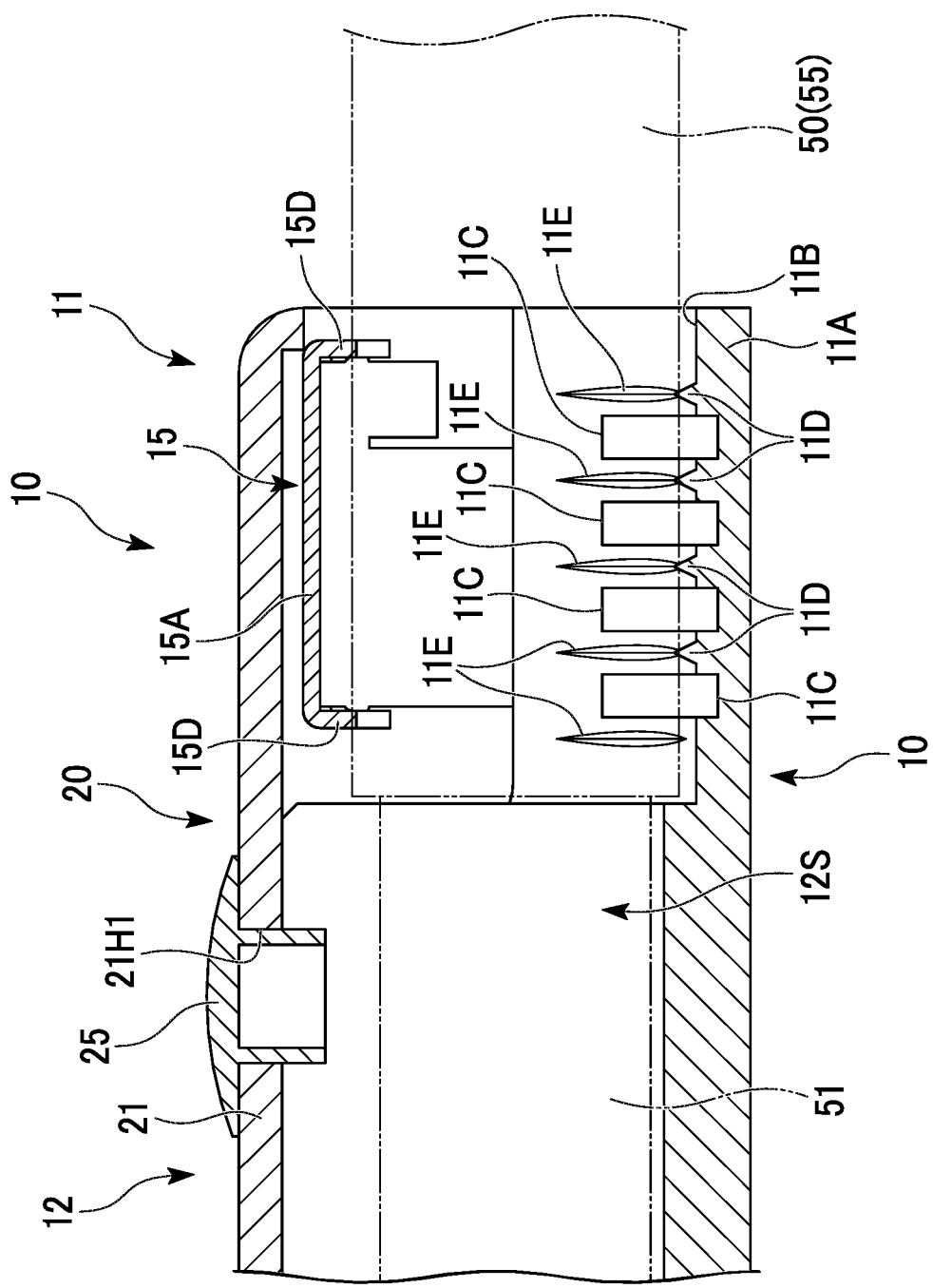
FIG. 7 is an enlarged side cross-sectional view of the intake port of the first branch case in accordance with one or more embodiments.

As shown in FIG. 7, the jacket 55 of the optical fiber-cable 50 is sandwiched between the cable receiving recessed groove 11B of the intake portion 11 and the holding member main body 15A of the holding member 15. In this manner, the optical fiber-cable 50 is held by the holding member 15 and the intake portion 11. A washer 16B is interposed between the fastening portion 15B and the intake portion main body 11A.

Notch portions 15D disposed apart from each other at substantially equal intervals in a circular arc direction are formed at upper and lower ends of the holding member main body 15A. The notch portion 15D has a pointed tip. The notch portion 15D bites into the jacket 55 of the optical fiber-cable 50 in a state where the jacket 55 of the optical fiber-cable 50 is held by the intake portion 11 and the holding member 15. In this manner, the holding member 15 hold-fixes an end portion of the jacket 55 of the optical fiber-cable 50 onto the intake portion 11 of the branch case main body 10.

As shown in FIGS. 4 and 5, the accommodation portion 12 of the first branch case body 10 includes a left wall portion 12L and a right wall portion 12R. A left surplus space forming wall portion 12C and a right surplus space forming wall portion 12D are formed in the left wall portion 12L and the right wall portion 12R, respectively. An upper left connecting wall portion 12E is formed at an upper edge of the left wall portion 12L and the left surplus space forming wall portion 12C. An upper right connecting wall portion 12F is formed at an upper edge of the right wall portion 12R and the right surplus space forming wall portion 12D. A left surplus space 12LS is formed in a region surrounded by the left wall portion 12L, the left surplus space forming wall portion 12C, and the upper left connecting wall portion 12E. A right surplus space 12RS is formed in a region surrounded by the right wall portion 12R, the right surplus space forming wall portion 12D, and the upper right connecting wall portion 12F.

In each of the left wall portion 12L and the right wall portion 12R, an upper portion has a linear shape along an up-down direction (Z direction) as viewed from the front, and a lower portion has a linear shape that the left wall portion 12L and the right wall portion 12R are inclined in such a direction that the left wall portion 12L and the right wall portion 12R are slightly separated from each other downward as viewed from the front. In each of the left and right surplus space forming wall portions 12C and 12D, an upper portion has a linear shape along an up-down direction (Z direction) as viewed from the front. However, the linear portions in the left and right surplus space forming wall portions 12C and 12D are shorter than the linear portions in the left and right wall portions 12L and 12R.

A position lower than an upper portion of each of the left and right surplus space forming wall portion 12C and 12D has a linear shape that the left and right surplus space forming wall portions 12C and 12D are inclined in such a direction that the left and right surplus space forming wall portion 12C and 12D are slightly separated from each other downward. However, an angle between an upper straight line in an up-down direction and a lower inclined straight line is (drastically) smaller on a narrow angle side in the left and right surplus space forming wall portions 12C and 12D than in the left and right wall portions 12L and 12R.

Between the left surplus space forming wall portion 12C and the right surplus space forming wall portion 12D, an optical fiber accommodation portion 12S which accommodates the optical fiber unit 51 is formed. A front surface of the optical fiber accommodation portion 12S has an inverted funnel shape with a funnel turned upside down. An upper portion 12SA has a vertically elongated rectangular shape. A lower portion 12SB has a substantially triangular shape expanding a width thereof downward. A bottom surface of the upper portion 12SA has a semicircular cross section having substantially the same diameter as the cable receiving recessed groove 11B. A bottom surface of the lower portion 12SB has a planar shape. The optical fiber accommodation portion 12S accommodates the optical fiber unit 51 obtained by removing the jacket 55 from the optical fiber-cable 50. In the optical fiber unit 51, a wrapping tube 54 has been also removed together with the jacket 55.

Figure 11:
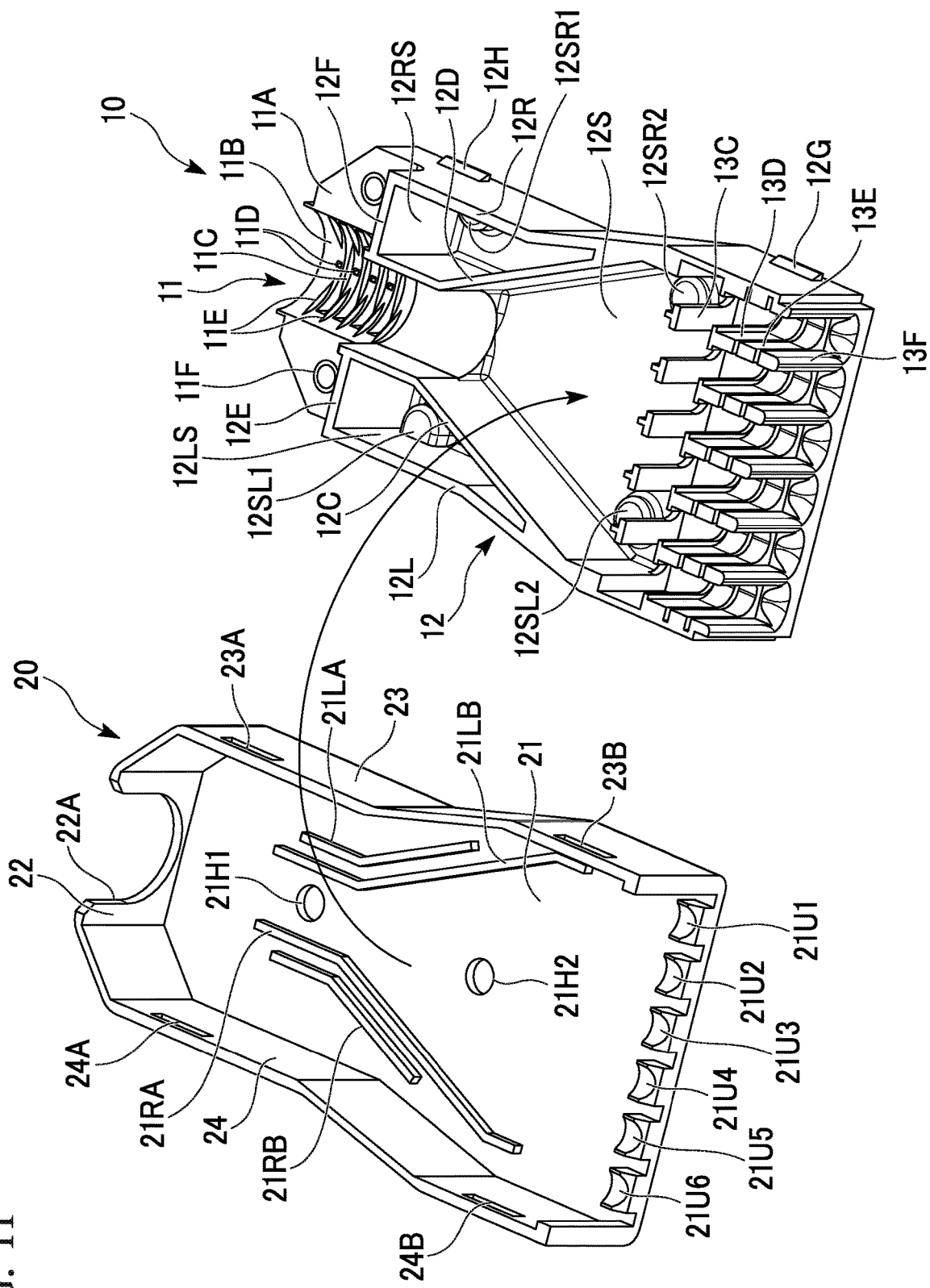
FIG. 11 is a perspective view showing a back surface side of a first branch case lid member and a front surface side of a first branch case main body in accordance with one or more embodiments.

As shown in FIG. 11, an upper left attachment hole 12SL1 is formed on a back surface side of the left surplus space 12LS, and an upper right attachment hole 12SR1 is formed on a back surface side of the right surplus space 12RS. A lower left attachment hole 12SL2 and a lower right attachment hole 12SR2 are formed on a back surface side of the optical fiber accommodation portion 12S. The lower left attachment hole 12SL2 and the lower right attachment hole 12SR2 are formed at a left lower end portion and a right lower end portion of the optical fiber accommodation portion 12S, respectively. The upper left attachment hole 12SL1 and the upper right attachment hole 12SR1 are formed at substantially the same height position, and the lower left attachment hole 12SL2 and the lower right attachment hole 12SR2 are formed at substantially the same height position.

Figure 8:
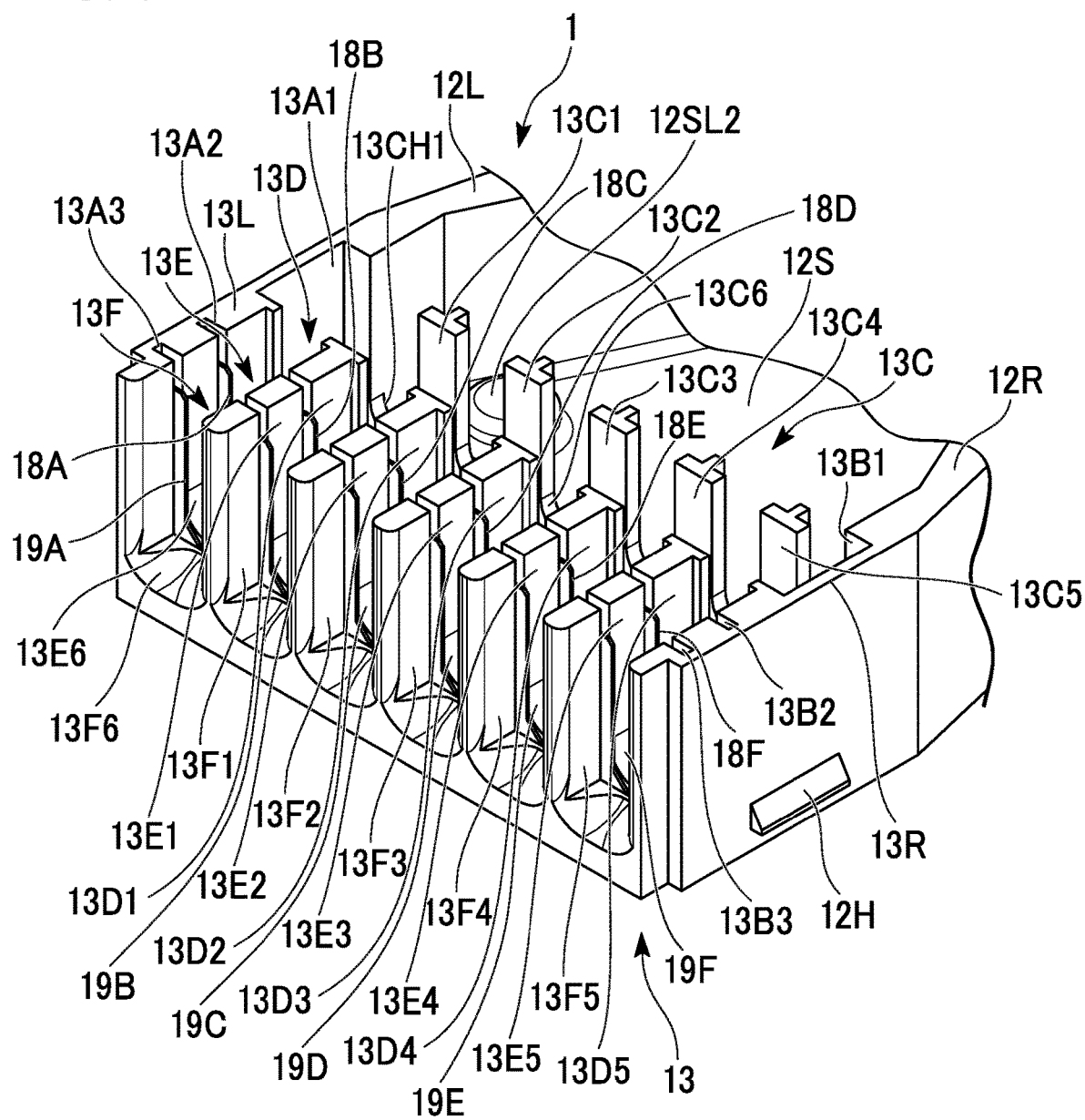
FIG. 8 is an enlarged perspective view of a take-out port of the first branch case in accordance with one or more embodiments.

The fixing portion 13 which is configured to fix the protective tube 60 which is configured to protect the optical fiber unit 51 between the accommodation portion 12 and the take-out port is formed at a lower position in the accommodation portion 12. As shown in FIG. 8, the fixing portion 13 includes a left wall extending portion 13L extending from the left wall portion 12L in the accommodation portion 12 and a right wall extending portion 13R extending from the right wall portion 12R. The fixing portion 13 includes a first partition member 13C, a second partition member 13D, a third partition member 13E, and a fourth partition member 13F. The first partition member 13C, the second partition member 13D, the third partition member 13E, and the fourth partition member 13F are disposed in this order from above. The first partition member 13C, the second partition member 13D, the third partition member 13E, and the fourth partition member 13F each have a comb shape.

The first partition member 13C includes first partition column members 13C1 to 13C5 juxtaposed at substantially equal intervals in a left-right direction in order from the left side, and a first connecting member 13C6 which connects lower end portions of the first partition column members 13C1 to 13C5. The second partition member 13D includes five second partition column members 13D1 to 13D5 juxtaposed at substantially equal intervals in a lateral direction in order from the left side, and a second connecting member which connects lower end portions of the second partition column members 13D1 to 13D5.

The third partition member 13E includes five third partition column members 13E1 to 13E5 juxtaposed at substantially equal intervals in a lateral direction in order from the left side, and a third connecting member 13E6 which connects lower end portions of the third partition column members 13E1 to 13E5. The fourth partition member 13F includes five fourth partition column members 13F1 to 13F5 juxtaposed at substantially equal intervals in a lateral direction in order from the left side, and a fourth connecting member 13F6 which connects lower end portions of the fourth partition column members 13F1 to 13F5. In the partition members 13C to 13F, the protective tube 60 is inserted into adjacent column members.

The first partition column members 13C1 to 13C5 extend in a direction intersecting with a longitudinal direction of the protective tube 60, here, in a direction perpendicular thereto. The second partition column members 13D1 to 13D5, the third partition column members 13E1 to 13E5, and the fourth partition column members 13F1 to 13F5 also extend in a direction intersecting with the longitudinal direction of the protective tube 60, that is, in a direction perpendicular thereto.

A connecting portion between each of the first partition column members 13C1 and 13C2 and the first connecting member 13C6 in the first partition member 13C is formed so as to have a semicircular cross section. The diameter of the connecting portion is substantially the same as the diameter of the protective tube 60. However, the diameter may be larger or smaller than the diameter of the protective tube 60. A connecting portion between each of the first partition column members 13C2 to 13C5 and the first connecting member 13C6 also has the same shape. A connecting portion between each of the second partition column members 13D1 to 13D5 and the second connecting member in the second partition member 13D is also formed so as to have a similar semicircular cross section. A connecting portion between each of the third partition column members 13E1 to 13E5 and the third connecting member 13E6 in the third partition member 13E is also formed so as to have a similar semicircular cross section. A connecting portion between each of the fourth partition column members 13F1 to 13F5 and the fourth connecting member 13F6 in the fourth partition member 13F is also formed so as to have a similar semicircular cross section.

The first partition column members 13C1 to 13C5 in the first partition member 13C each have a columnar shape with a protruded cross section. The second partition column members 13D1 to 13D5 in the second partition member 13D each have a columnar shape with a T-shaped cross section. The third partition column members 13E1 to 13E5 in the third partition member 13E each have a columnar shape with a rectangular cross section. The fourth partition column members 13F1 to 13F5 in the fourth partition member 13F each have a columnar shape with a rectangular cross section having a circular arc-shaped lower end.

Each of bottom sides of the first partition column members 13C1 to 13C5 in the first partition member 13C has substantially the same length as each of upper sides of the second partition column members 13D1 to 13D5 in the second partition member 13D. Each of bottom sides of the second partition column members 13D1 to 13D5 in the second partition member 13D has substantially the same length as each of upper sides of the third partition column members 13E1 to 13E5 in the third partition member 13E. Each of bottom sides of the third partition column members 13E1 to 13E5 in the third partition member 13E has substantially the same length as each of upper sides of the fourth partition column members 13F1 to 13F5 in the fourth partition member 13F.

A first partition first recess 13CH1 is formed between the first partition left end column member 13C1 and the left wall extending portion 13L in the first partition member 13C. Similarly, a first partition second recess to a first partition sixth recess are formed between the first partition column members adjacent to each other of the first partition column members 13C1 to 13C5 in the first partition member 13C and between the first partition right end column member 13C5 and the right wall extending portion 13R. The widths of the first partition first recess to the first partition sixth recess are substantially the same as one another.

A second partition first recess (not shown) is formed between the second partition left end column member 13D1 and the left wall extending portion 13L in the second partition member 13D. A second partition second recess to a second partition sixth recess are formed between the second partition column members adjacent to each other of the second partition column members 13D1 to 13D5 in the second partition member 13D and between the second partition right end column member 13D5 and the right wall extending portion 13R. The widths of the second partition first recess to the second partition sixth recess are substantially the same as one another.

A third partition first recess (not shown) is formed between the third partition left end column member 13E1 and the left wall extending portion 13L in the third partition member 13E. A third partition second recess to a third partition sixth recess are formed between the third partition column members adjacent to each other of the third partition column members 13E1 to 13E5 in the third partition member 13E and between the third partition right end column member 13E5 and the right wall extending portion 13R. The widths of the third partition first recess to the third partition sixth recess are substantially the same as one another.

A fourth partition first recess (not shown) is formed between the fourth partition left end column member 13F1 and the left wall extending portion 13L in the fourth partition member 13F. A fourth partition second recess to a fourth partition sixth recess are formed between the fourth partition column members adjacent to each other of the fourth partition column members 13F1 to 13F5 in the fourth partition member 13F and between the fourth partition right end column member 13F5 and the right wall extending portion 13R. The widths of the fourth partition first recess to the fourth partition sixth recess are substantially the same as one another.

The widths of the first partition first recess 13CH1, the second partition first recess, the third partition first recess, and the fourth partition first recess are substantially the same as one another. Similarly, widths of the first partition second recess to the first partition sixth recess, the second partition second recess to the second partition sixth recess, the third partition second recess to the third partition sixth recess, and the fourth partition second recess to the fourth partition sixth recess are substantially the same as one another.

A first left cut-out portion 13A1 recessed in a left direction is formed in the left wall extending portion 13L corresponding to a space between the first partition member 13C and the second partition member 13D. A first right cut-out portion 13B1 recessed in a right direction is formed in the right wall extending portion 13R corresponding to a space between the first partition member 13C and the second partition member 13D. Similarly, a second left cut-out portion 13A2 is formed in the left wall extending portion 13L corresponding to a space between the second partition member 13D and the third partition member 13E. A second right cut-out portion 13B2 is formed in the right wall extending portion 13R between the second partition member 13D and the third partition member 13E. A third left cut-out portion 13A3 is formed in the left wall extending portion 13L between the third partition member 13E and the fourth partition member 13F. A third right cut-out portion 13B3 is formed in the right wall extending portion 13R between the third partition member 13E and the fourth partition member 13F.

Figure 10:
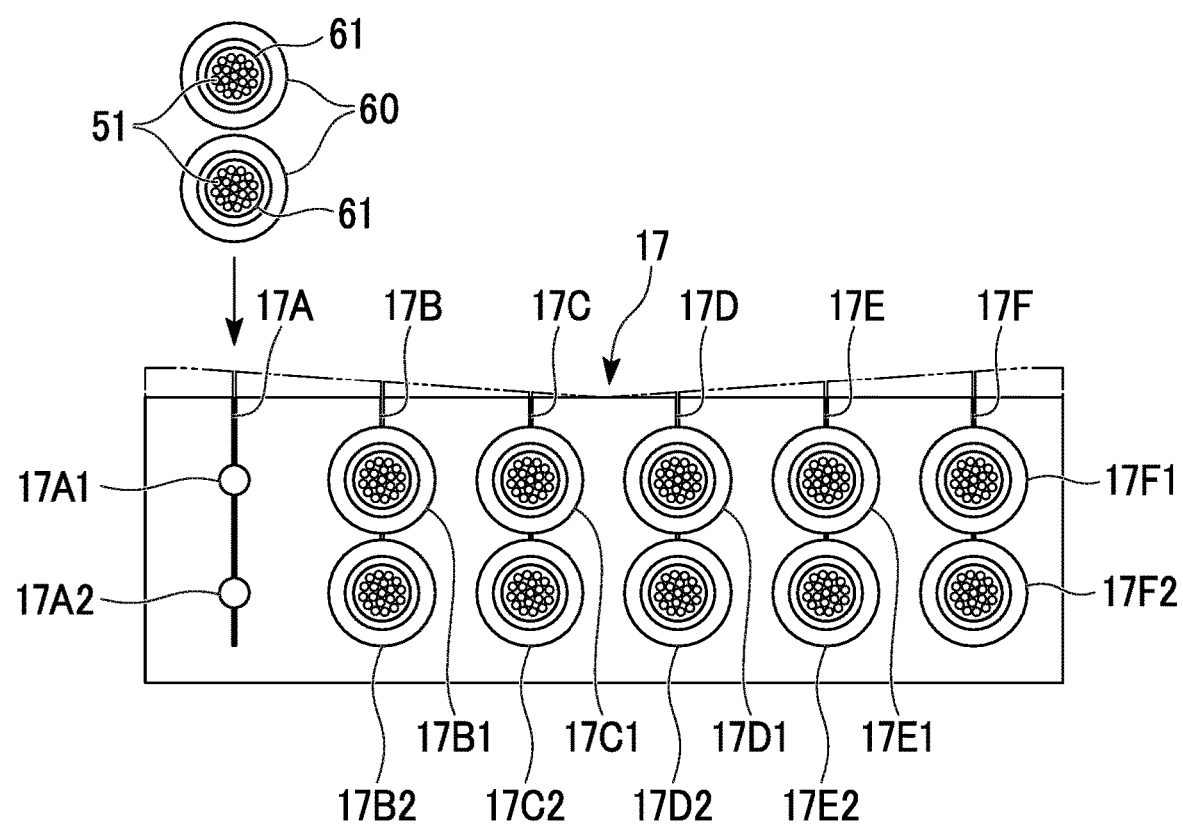
FIG. 10 is an explanatory diagram of a protective tube accommodated in a stopper in accordance with one or more embodiments.

A stopper 17 shown in FIGS. 4 and 10 is accommodated between the first partition member 13C and the second partition member 13D. The stopper 17 is disposed in the first partition member 13C and the second partition member 13D and is sandwiched between the first left cut-out portion 13A1 and the first right cut-out portion 13B1. The widths of the first left cut-out portion 13A1 and the first right cut-out portion 13B1 are substantially the same as the thickness of the stopper 17. The widths of the first left cut-out portion 13A1 and the first right cut-out portion 13B1 may be slightly shorter or longer than the thickness of the stopper 17.

The stopper 17 is made of a flexible sponge. As shown in FIG. 10, the stopper 17 includes a first cut portion 17A to a sixth cut portion 17F formed at substantially equal intervals in a left-right direction in order from the left side. The cut portions 17A to 17F are formed by being cut from a front surface of the stopper 17 toward a back surface thereof, and cutting is completed before reaching the back surface. A separation distance among the first cut portion 17A to the sixth cut portion 17F is substantially the same as a separation distance among the first partition column members 13C1 to 13C5 in the first partition member 13C.

A first front positioning hole 17A1 and a first rear positioning hole 17A2 are formed in the first cut portion 17A. A separation distance between the first front positioning hole 17A1 and the first rear positioning hole 17A2 is substantially the same as the diameter of the optical fiber unit 51. Similarly, a second front positioning hole 17B1 to a sixth front positioning hole 17F1 and a second rear positioning hole 17B2 to a sixth rear positioning hole 17F2 are formed in the second cut portion 17B to the sixth cut portion 17F. The optical fiber unit 51 is attached to each of the positioning holes 17A1 to 17F1 and 17A2 to 17F2. The optical fiber units 51 are attached in two stages to each of the first cut portion 17A to the sixth cut portion 17F. Each of the first front positioning hole 17A1 to the sixth front positioning hole 17F1 and the first rear positioning hole 17A2 to the sixth rear positioning hole 17F2 expands a width thereof so as to have substantially the same diameter as the optical fiber unit 51 by attachment of the optical fiber unit 51.

When the optical fiber unit 51 is attached to the stopper 17, as shown in FIG. 10, the optical fiber unit 51 is inserted into the first cut portion 17A from a front surface direction of the stopper 17. The optical fiber unit 51 is moved as it is toward a bottom surface direction and attached to a position of the first rear positioning hole 17A2. Subsequently, the optical fiber unit 51 is inserted into the first cut portion 17A of the first cut portion 17A from a front surface direction of the stopper 17. The optical fiber unit 51 is moved as it is toward a bottom surface direction and attached to a position of the first front positioning hole 17A1.

Before being accommodated in the first branch case 1, the stopper 17 has a shape in which a central portion of the front surface is further recessed than a side portion as indicated by an imaginary line in FIG. 10. When the stopper 17 is accommodated in the first branch case 1 and the first branch case lid member 20 is attached to the first branch case main body 10, the stopper 17 is crushed by the first branch case main body 10 and the first branch case lid member 20 and has a rectangular shape as shown by a solid line in FIG. 10. By being crushed by the first branch case main body 10 and the first branch case lid member 20, the stopper 17 comes into close contact with the first branch case main body 10 and the first branch case lid member 20.

An upper fixing plate 18 is accommodated between the second partition member 13D and the third partition member 13E. The second partition member 13D and the third partition member 13E support the upper fixing plate 18. The second partition member 13D and the third partition member 13E are support members of the upper fixing plate 18. The upper fixing plate 18 is a metal plate having a rectangular outer shape, for example. The upper fixing plate 18 is disposed between the second partition member 13D and the third partition member 13E and sandwiched between the second left cut-out portion 13A2 and the second right cut-out portion 13B2. In this manner, the upper fixing plate 18 is bridged between the plurality of column members. The widths of the second left cut-out portion 13A2 and the second right cut-out portion 13B2 are longer than the thickness of the upper fixing plate 18. However, the widths of the second left cut-out portion 13A2 and the second right cut-out portion 13B2 may be substantially the same as the thickness of the upper fixing plate 18.

The upper fixing plate 18 includes upper fixing grooves 18A to 18F into which the protective tubes 60 are inserted for fixing. The upper fixing plate 18 has a comb shape in which the upper first fixing groove 18A to the upper sixth fixing groove 18F are juxtaposed. In the upper fixing plate 18, the upper first fixing groove 18A to the upper sixth fixing groove 18F are formed at substantially equal intervals in a left-right direction in order from the left side. The widths of the upper first fixing groove 18A to the upper sixth fixing groove 18F are substantially equal to one another. The width of the upper first fixing groove 18A is shorter than a width between the left wall extending portion 13L and the first partition left end column member 13C1 in the first partition member 13C and longer than the width of the protective tube 60. A separation distance between center portions of the upper first fixing groove 18A to the upper sixth fixing groove 18F in a width direction is substantially the same as a separation distance between center portions of the first partition column members 13C1 to 13C5 in the first partition member 13C in a width direction.

Both side edges constituting the upper first fixing groove 18A of the upper fixing plate 18 further protrude inward than a space between the second partition column members 13D1 and 13D2 in the second partition member 13D. The both side edges constituting the upper first fixing groove 18A of the upper fixing plate 18 are protrusions which retain the protective tube 60. Similarly, both side edges constituting the upper second fixing groove 18B to the sixth fixing groove 18F of the upper fixing plate 18 are protrusions which retain the protective tube 60.

A lower fixing plate 19 is accommodated between the third partition member 13E and the fourth partition member 13F. The third partition member 13E and the fourth partition member 13F support the lower fixing plate 19. The third partition member 13E and the fourth partition member 13F are support members of the lower fixing plate 19. The lower fixing plate 19 is a metal plate having a rectangular outer shape, for example. The lower fixing plate 19 is disposed between the third partition member 13E and the fourth partition member 13F and sandwiched between the third left cut-out portion 13A3 and the third right cut-out portion 13B3. The lower fixing plate 19 has substantially the same shape as the upper fixing plate 18. The widths of the third left cut-out portion 13A3 and the third right cut-out portion 13B3 are longer than the thickness of the lower fixing plate 19. However, the widths of the third left cut-out portion 13A3 and the third right cut-out portion 13B3 may be substantially the same as the thickness of the lower fixing plate 19.

Both side edges constituting a lower first fixing groove 19A of the lower fixing plate 19 further protrude inward than a space between the third partition column members 13E1 and 13E2 in the third partition member 13E. The both side edges constituting the lower first fixing groove 19A of the lower fixing plate 19 are protrusions which retain the protective tube 60. Similarly, both side edges constituting the lower second fixing groove 19B to the lower sixth fixing groove 19F of the lower fixing plate 19 are protrusions which retain the protective tube 60.

Like the upper fixing plate 18, the lower fixing plate 19 includes the lower first fixing groove 19A to the lower sixth fixing groove 19F into which the protective tubes 60 are inserted for fixing. The lower fixing plate 19 has a comb shape in which the lower first fixing groove 19A to the lower sixth fixing groove 19F are juxtaposed. In the lower fixing plate 19, the lower first fixing groove 19A to the lower sixth fixing groove 19F are formed at substantially equal intervals in a left-right direction in order from the left side. The widths of the lower first fixing groove 19A to the lower sixth fixing groove 19F are substantially equal to one another. The width of the lower first fixing groove 19A is shorter than a width between the left wall extending portion 13L and the second partition left end column member 13D1 in the second partition member 13D and longer than the width of the protective tube 60. A separation distance between center portions of the lower first fixing groove 19A to the lower sixth fixing groove 19F in a width direction is substantially the same as a separation distance between center portions of the second partition column members 13D1 to 13D5 in the second partition member 13D in a width direction.

Figure 9A:
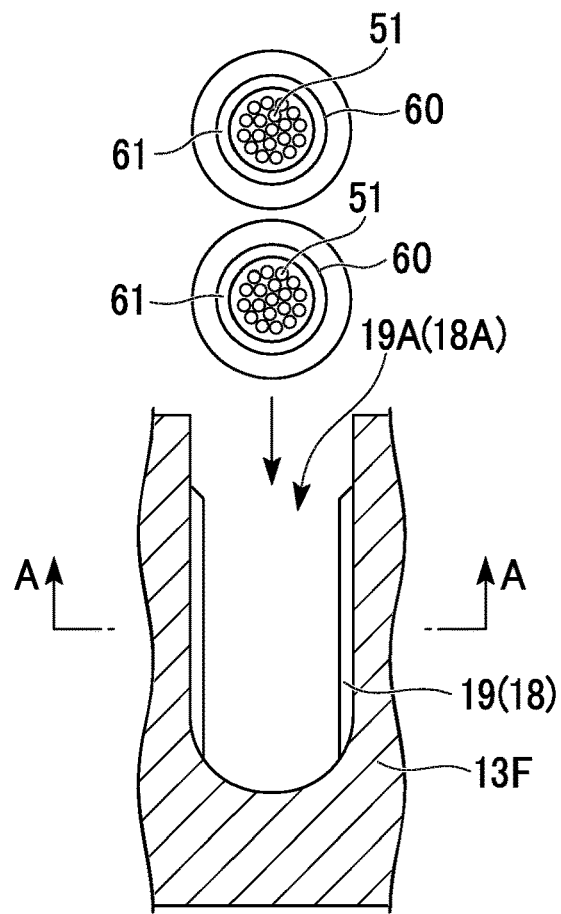
FIG. 9A is a front cross-sectional view of a fixing plate before a protective tube is inserted in accordance with one or more embodiments.
Figure 9B:
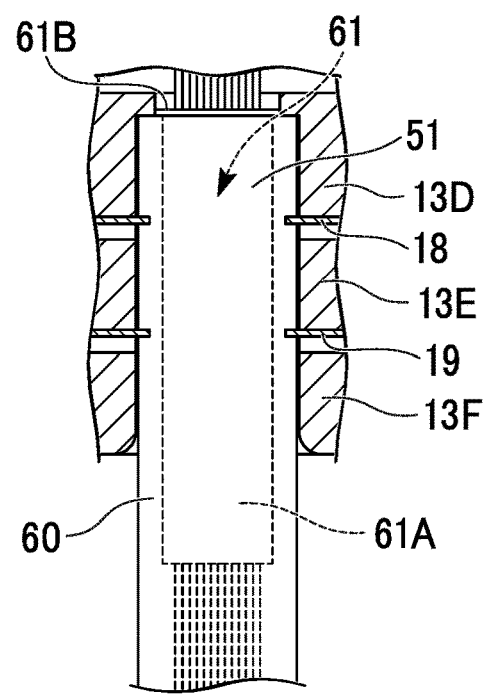
FIG. 9B is a cross-sectional view taken along line A-A of FIG. 9A.

The optical fiber unit 51 disposed below the stopper 17 is covered with the protective tube 60 and protected by the protective tube 60. The protective tube 60 covered over the optical fiber unit 51 is fixed by the upper fixing plate 18 and the lower fixing plate 19. When the protective tube 60 is fixed to the upper fixing plate 18 and the lower fixing plate 19, as shown in FIGS. 9A and 9B, the protective tube 60 is inserted from a front surface direction of the fixing grooves 18A to 18F and 19A to 19F of the upper and lower fixing plates 18 and 19.

Figure 9C:
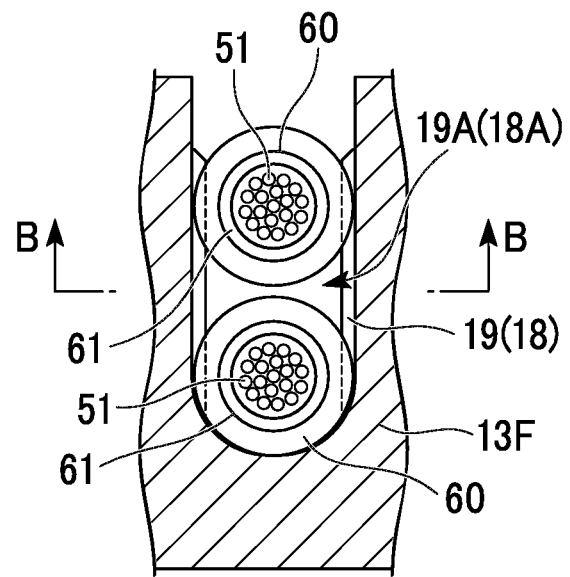
FIG. 9C is a front cross-sectional view of the fixing plate after the protective tube is inserted in accordance with one or more embodiments.
Figure 9D:
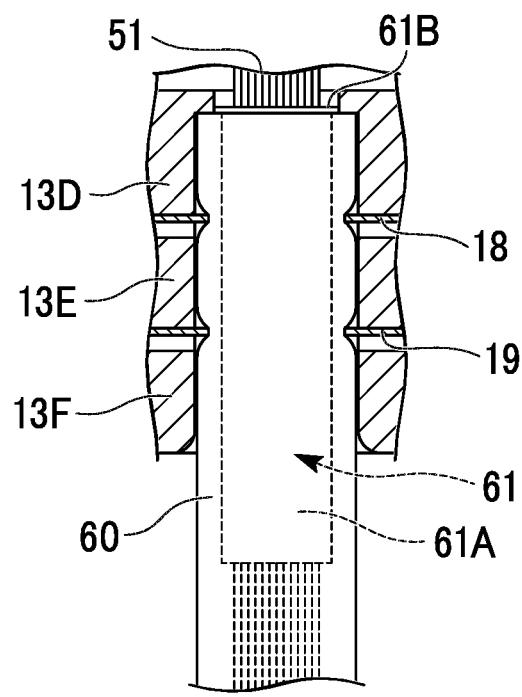
FIG. 9D is a cross-sectional view taken along line B-B of FIG. 9C.

The width of each of the fixing grooves 18A to 18F and 19A to 19F is narrower than the width of the protective tube 60. Meanwhile, the protective tube 60 has flexibility. Therefore, when the protective tube 60 is inserted from a front surface direction of the fixing grooves 18A to 18F and 19A to 19F of the upper and lower fixing plates 18 and 19, as shown in FIGS. 9C and 9D, the protective tube 60 is warped and inserted into a space among the fixing grooves 18A to 18F and 19A to 19F. At this time, the protective tube 60 is restrained by the fixing grooves 18A to 18F and 19A to 19F due to an elastic force of the protective tube 60. In this manner, the protective tube 60 is fixed to the fixing grooves 18A to 18F and 19A to 19F. The fixing portion 13 hold-fixes the protective tube 60 with the upper fixing plate 18 and the lower fixing plate 19. The fixing portion 13 includes the two fixing plates of the upper fixing plate 18 and the lower fixing plate 19 but may include one fixing plate or three or more fixing plates. The six fixing grooves 18A to 18F and the six fixing grooves 19A to 19F are formed in the fixing plates 18 and 19, respectively. However, the number of the fixing grooves may be one or two or more except for six.

An insert ring (shape retaining member) 61 is accommodated in the protective tube 60 hold-fixed onto the fixing portion 13. The insert ring 61 is a metal member including a tubular portion 61A disposed in a longitudinal direction of the protective tube 60 and a ring portion 61B disposed at a tip portion of the tubular portion 61A and serving as a width-expanding portion having a larger diameter than the tubular portion 61A. The tubular portion 61A has an outer diameter substantially the same as the inner diameter of the protective tube 60, and has a hollow portion formed therein.

The optical fiber unit 51 is inserted into the tubular portion 61A of the insert ring 61. The ring portion 61B has an annular shape with a larger diameter than the tubular portion 61A and has an outer diameter larger than the outer diameter of the protective tube 60. In the insert ring 61, the tubular portion 61A is disposed in the protective tube 60, and the ring portion 61B is disposed outside a tip portion of the protective tube 60. When the protective tube 60 is hold-fixed onto the fixing portion 13, the ring portion 61B of the insert ring 61 is disposed along a tip of the second partition column member 13D1 in the second partition member 13D.

The take-out portion 14 is formed on the side opposite to the intake portion 11 in the fixing portion 13. The take-out portion 14 is formed by overlapping an opening portion which is formed in a lower end portion of the first branch case main body 10 and opens in front and upper portions thereof with an opening portion which is formed in a lower end portion of the first branch case lid member 20 and opens in front and lower portions thereof. Therefore, the take-out portion 14 is formed as an opening portion which opens in a lower portion thereof.

Fitting protrusions 12G and 12H are formed at an outer upper position and an outer lower position of the right wall portion 12R of the first branch case main body 10. Similar fitting protrusions (not shown) are formed at an outer upper position and an outer lower position of the left wall portion 12L of the first branch case main body 10. These fitting protrusions 12G and 12H and the not-shown fitting protrusions have the same shape as one another.

As shown in FIG. 11, the inner shape of the first branch case lid member 20 in the first branch case 1 has substantially the same inner shape as the outer shape excluding the fitting protrusions 12G and 12H and the not-shown fitting protrusions in the first branch case main body 10. The first branch case lid member 20 includes a front surface plate 21. An upper surface plate 22, a left side surface plate 23, and a right side surface plate 24 are attached along side edges of the front surface plate 21.

As shown in FIG. 11, a cable intake hole 22A is formed in the upper surface plate 22. The cable intake hole 22A has a semicircular shape at a front side thereof and a substantially rectangular shape at a rear side thereof. When the first branch case lid member 20 is attached to the first branch case main body 10, the cable receiving recessed groove 11B in the first branch case main body 10 and the cable intake hole 22A in the first branch case lid member 20 form an intake port for the optical fiber-cable 50.

Fitting holes 23A and 23B are formed at an upper position and a lower position of the left side surface plate 23, respectively. Fitting holes 24A and 24B are formed at an upper position and a lower position of the right side surface plate 24, respectively. The fitting protrusions (not shown) formed in the left wall portion 12L of the first branch case main body 10 can be fitted into the fitting holes 23A and 23B. The fitting protrusions 12G and 12H formed in the right wall portion 12R of the first branch case main body 10 can be fitted into the fitting holes 24A and 24B. The fitting protrusions (not shown) and the fitting protrusions 12G and 12H in the first branch case main body 10 are fitted into the fitting holes 23A, 23B, 24A, and 24B in the first branch case lid member 20, and the first branch case lid member 20 is thereby fixed and attached to the first branch case main body 10. When the second branch case lid member 20 is attached to the first branch case main body 10, an opening portion is formed in a lower end portion of the first branch case 1. This opening portion serves as a take-out port for the optical fibers 52.

A first injection hole 21H1 is formed above the center of the front surface plate 21 in a width direction. A second injection hole 21H2 is formed below the first injection hole 21H1. The first injection hole 21H1 is formed at a height position corresponding to an upper portion of the optical fiber accommodation portion 12S in the accommodation portion 12 of the first branch case main body 10 when the first branch case lid member 20 is attached to the first branch case main body 10. The second injection hole 21H2 is formed at a height position corresponding to a lower portion of the optical fiber accommodation portion 12S in the accommodation portion 12 of the first branch case main body 10 when the first branch case lid member 20 is attached to the first branch case main body 10.

A first injection hole closing lid 25 shown in FIG. 3 is fitted into the first injection hole 21H1. The first injection hole closing lid 25 includes a columnar main body having substantially the same diameter as the inner diameter of the first injection hole 21H1 and a head portion attached to the main body and having a diameter larger than the diameter of the main body. The main body of the first injection hole closing lid 25 is fitted into the first injection hole 21H1, and the first injection hole 21H1 is closed by the head portion. A second injection hole closing lid 26 having the same shape as the first injection hole closing lid 25 is fitted into the second injection hole 21H2. Two injection holes of the first injection hole 21H1 and the first injection hole 21H1 are formed in the front surface plate 21. However, one injection hole may be formed, or three or more injection holes may be formed.

A left first ridge portion 21LA extending in an up-down direction and a left second ridge portion 21LB roughly along the left first ridge portion 21LA are formed on the left side of a back surface of the front surface plate 21. A right first ridge portion 21RA extending in an up-down direction and a right second ridge portion 21RB roughly along the right first ridge portion 21RA are formed on the right side of a back surface of the front surface plate 21.

The left first ridge portion 21LA is formed at a position along an outside of an upper edge of the left surplus space forming wall portion 12C in the first branch case main body 10 when the first branch case lid member 20 is attached to the first branch case main body 10. The left second ridge portion 21LB is formed at a position along an inside of an upper edge of the left surplus space forming wall portion 12C in the first branch case main body 10 when the first branch case lid member 20 is attached to the first branch case main body 10.

The right first ridge portion 21RA is formed at a position along an outside of an upper edge of the right surplus space forming wall portion 12D in the first branch case main body 10 when the first branch case lid member 20 is attached to the first branch case main body 10. The right second ridge portion 21RB is formed at a position along an inside of an upper edge of the right surplus space forming wall portion 12D in the first branch case main body 10 when the first branch case lid member 20 is attached to the first branch case main body 10.

A width between the left first ridge portion 21LA and the left second ridge portion 21LB is substantially the same as the thickness of the left wall portion 12L. However, the width between the left first ridge portion 21LA and the left second ridge portion 21LB may be larger than the thickness of the left surplus space forming wall portion 12C. A width between the right first ridge portion 21RA and the right second ridge portion 21RB is substantially the same as the thickness of the right surplus space forming wall portion 12D. The width between the right first ridge portion 21RA and the right second ridge portion 21RB may be larger than the thickness of the right wall portion 12R.

Protective tube receiving portions 21U1 to 21U6 are formed at a lower end portion on a back surface side of the front surface plate 21. Each of the protective tube receiving portions 21U1 to 21U6 includes a groove portion having a substantially semicircular cross section. The diameter of each of the groove portions in the protective tube receiving portions 21U1 to 21U6 is substantially the same as the diameter of the protective tube 60. However, the diameter of each of the groove portions may be larger or smaller than the diameter of the protective tube 60. The protective tube receiving portions 21U1 to 21U6 are disposed at positions corresponding to the fourth partition member 13F when the first branch case lid member 20 is attached to the first branch case main body 10.

As shown in FIGS. 3 and 4, number displays 21N1 to 21N6 are formed on a front surface side of the front surface plate 21 corresponding to the protective tube receiving portions 21U1 to 21U6 formed on a back surface side of the front surface plate 21, respectively. A character "2" is displayed on the first number display 21N1, a character "4" is displayed on the second number display 21N2, and a character "6" is displayed on the third number display 21N3. A character "8" is displayed on the fourth number display 21N4, a character "10" is displayed on the fifth number display 21N5, and a character "12" is displayed on the sixth number display 21N6. Although not shown, number displays displaying characters "1", "3", "5", "7", "9", and "11"

are provided on a back surface side of the fixing portion 13 in the accommodation portion of the first branch case main body 10.

The optical fibers 52 are disposed in an internal space of the optical fiber accommodation portion 12S in the first branch case 1 in which the first branch case lid member 20 is attached to the first branch case main body 10. A resin material is filled in the internal space of the optical fiber accommodation portion 12S. The resin material is a one-component elastic adhesive. The resin material is in a liquid state at the time of injection and solidified as time elapses after injection. When being solidified, the resin material has a viscosity of 22.0 Pa·S. However, as the resin material, another resin material such as a two-component elastic adhesive may be used. The viscosity of the resin material may be other than the above viscosity.

As shown in FIG. 4, the attachment plate 30 includes a branch case attachment portion 31 and an installation position attachment portion 32. An upper left through hole 31L1, a lower left through hole 31L2, an upper right through hole 31R1, and a lower right through hole 31R2 are formed in the branch case attachment portion 31. The upper left through hole 31L1, the lower left through hole 31L2, the upper right through hole 31R1, and the lower right through hole 31R2 are formed at positions corresponding to the upper left attachment hole 12SL1, the lower left attachment hole 12SL2, the upper right attachment hole 12SR1, and the lower right attachment hole 12SR2 in the first branch case 1, respectively. By connecting the upper left through hole 31L1, the lower left through hole 31L2, the upper right through hole 31R1, and the lower right through hole 31R2 to the upper left attachment hole 12SL1, the lower left attachment hole 12SL2, the upper right attachment hole 12SR1, and the lower right attachment hole 12SR2 with screws 33 or the like, respectively, the first branch case 1 is attached to the attachment plate 30.

The installation position attachment portion 32 is formed above the branch case attachment portion 31. A left attachment hole 32L is formed on the left side of an upper end portion of the installation position attachment portion 32. A right attachment hole 32R is formed on the right side of the upper end portion of the installation position attachment portion 32. The left attachment hole 32L and the right attachment hole 32R are disposed so as to be separated from each other by a distance longer than the diameter of the optical fiber-cable 50.

Figure 12:
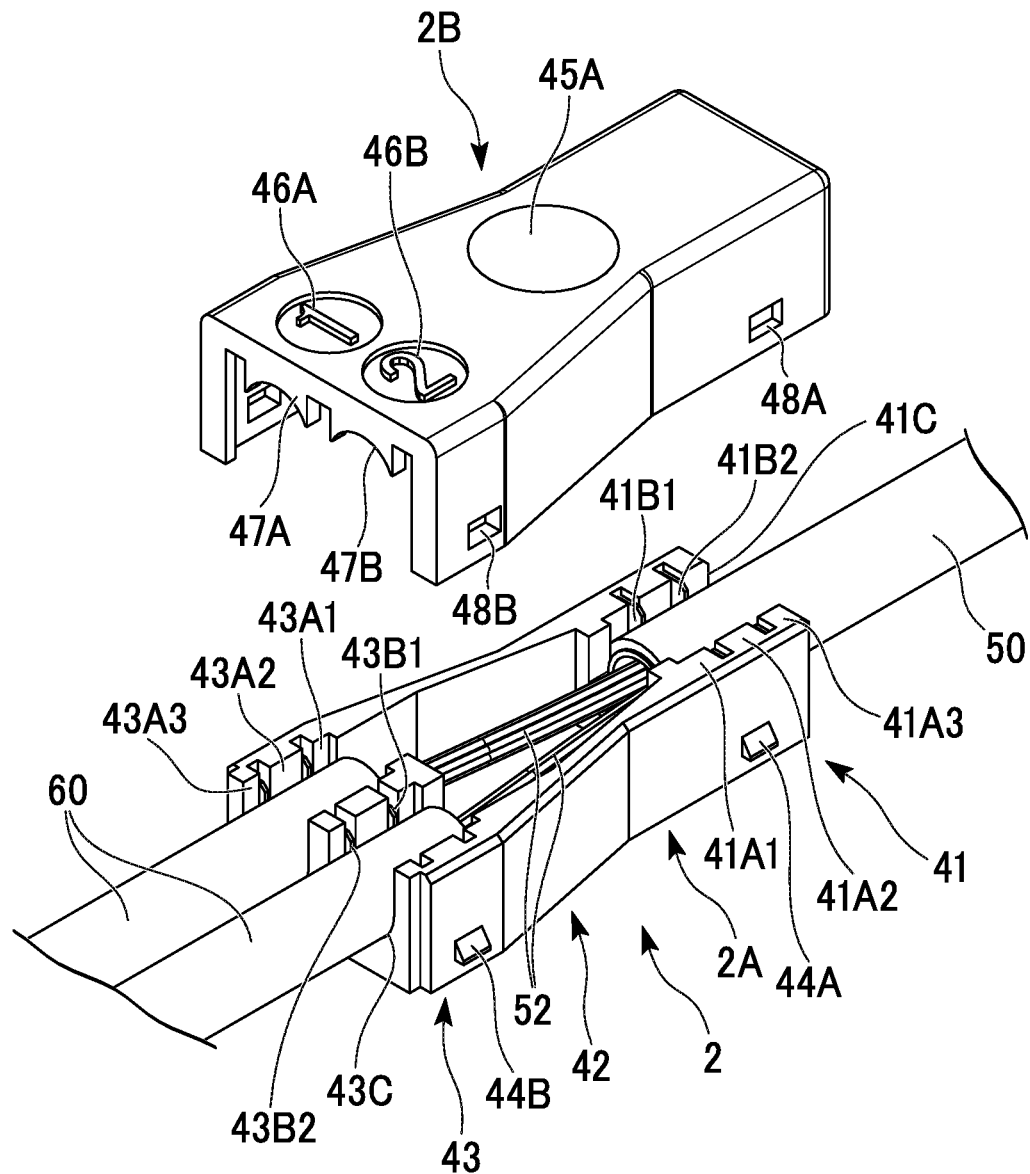
FIG. 12 is an exploded perspective view of a second branch case in accordance with one or more embodiments.

As shown in FIGS. 4 and 12, the second branch case 2 includes a second branch case main body 2A and a second branch case lid member 2B. The second branch case main body 2A includes an intake portion 41, an accommodation portion 42, and a take-out portion 43. The intake portion 41 includes partition portions 41A1 to 41A3 similar to the fixing portion 13 in the first branch case 1. Fixing plates 41B1 and 41B2 are disposed between the first partition portion 41A1 and the second partition portion 41A2 and between the second partition portion 41A2 and the third partition portion 41A3, respectively. One groove portion is formed in each of the first partition portion 41A1 to the third partition portion 41A3 and the fixing plates 41B1 and 41B2. An optical fiber unit intake port 41C which takes the optical fiber unit protected by the protective tube 60 in is formed at an upper end of the intake portion 41.

The accommodation portion 42 has a substantially triangular shape as viewed from the front and accommodates the optical fibers 52 obtained by unbinding the optical fiber unit 51. The take-out portion 43 includes a first partition portion 43A1, a second partition portion 43A2, and a third partition portion 43A3. Fixing plates 43B1 and 43B2 are disposed between the first partition portion 43A1 and the second partition portion 43A2 and between the second partition portion 43A2 and the third partition portion 43A3, respectively. Two groove portions are formed in each of the first partition portion 43A1 to the third partition portion 43A3 and the fixing plates 43B1 and 43B2. An optical fiber take-out port 43C which takes out the optical fibers 52 is formed at a lower end of the take-out portion 43. Fitting protrusions (not shown) and fitting protrusions 44A and 44B are formed at upper and lower positions of left and right side surfaces of the second branch case main body 2A, respectively.

The second branch case lid member 2B is attached to the second branch case main body 2A. The inner shape of the second branch case lid member 2B is substantially the same as the outer shape excluding the fitting protrusions 44A and 44B and the fitting protrusions (not shown) from the second branch case main body 2A. As shown in FIG. 4, an injection hole 45 is formed in the second branch case lid member 2B, and an injection hole closing lid 45A is attached to the injection hole 45. A resin material is not filled in the accommodation portion 42, but the resin material may be filled therein.

Number displays 46A and 46B are also provided on the second branch case lid member 2B. Protective tube receiving portions 47A and 47B are disposed on a back surface side of the surface on which the number displays 46A and 46B are provided. Each of the protective tube receiving portions 47A and 47B includes a groove portion having a substantially semicircular cross section. The diameter of each of the groove portions in the protective tube receiving portions 47A and 47B is substantially the same as the diameter of the protective tube 60. However, the diameter of each of the groove portions may be larger or smaller than the diameter of the protective tube 60. When being attached to the second branch case main body 2A, the protective tube receiving portions 47A and 47B and the second branch case lid member 2B are disposed at positions corresponding to the fixing plates 43B1 and 43B2.

Fitting recesses (not shown) and fitting recesses 48A and 48B are formed in upper and lower positions of left and right side surfaces of the second branch case lid member 2B. The fitting protrusions (not shown) and the fitting protrusions 44A and 44B formed in the second branch case main body 2A are fitted into the fitting recesses (not shown) and the fitting recesses 48A and 48B, and the second branch case lid member 2B is thereby fixed and attached to the second branch case main body 2A.

Figure 16:
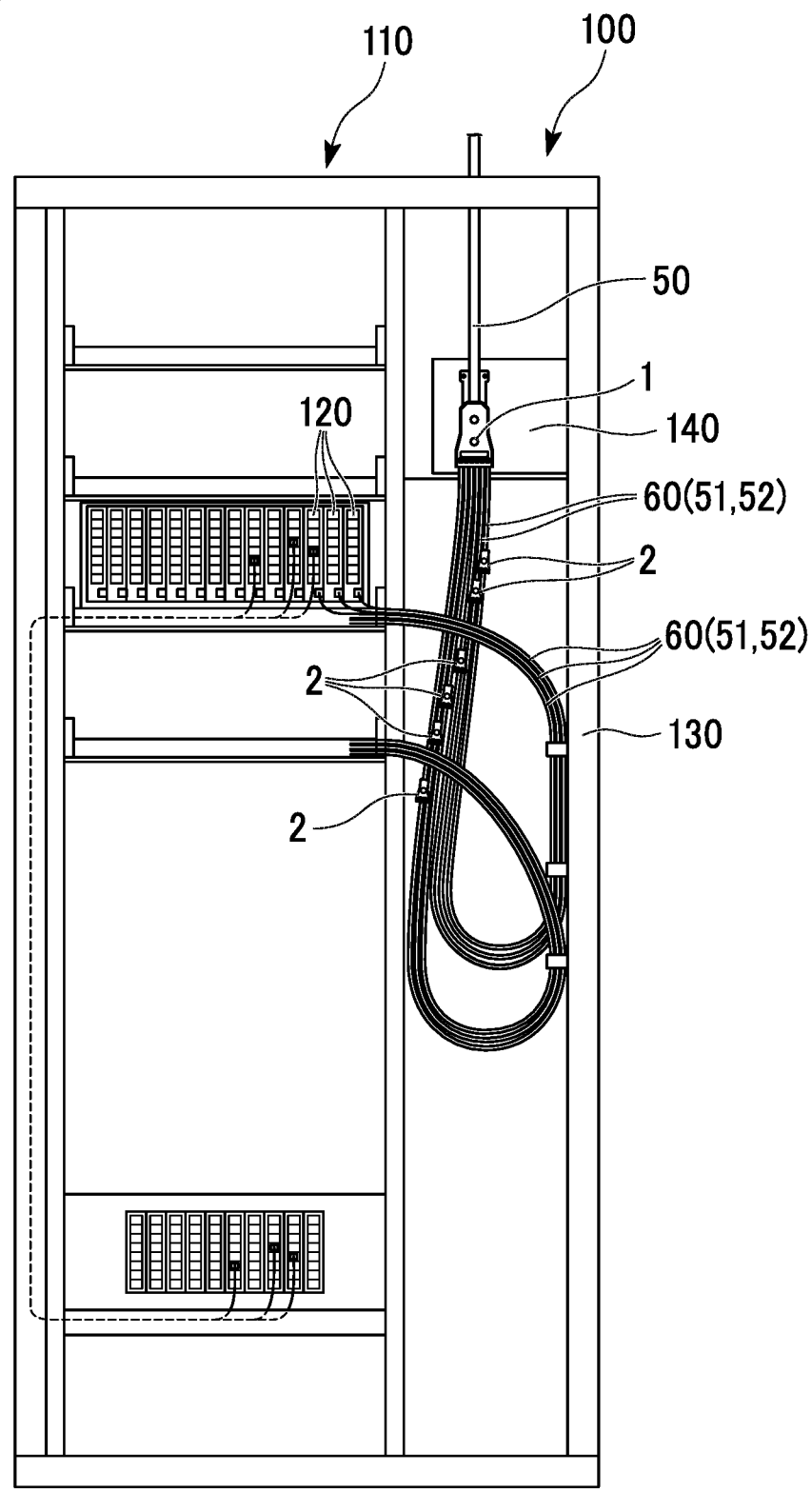
FIG. 16 is a rear view of an optical fiber-cable branch structure connected to a fusion tray in accordance with one or more embodiments.
Figure 17:
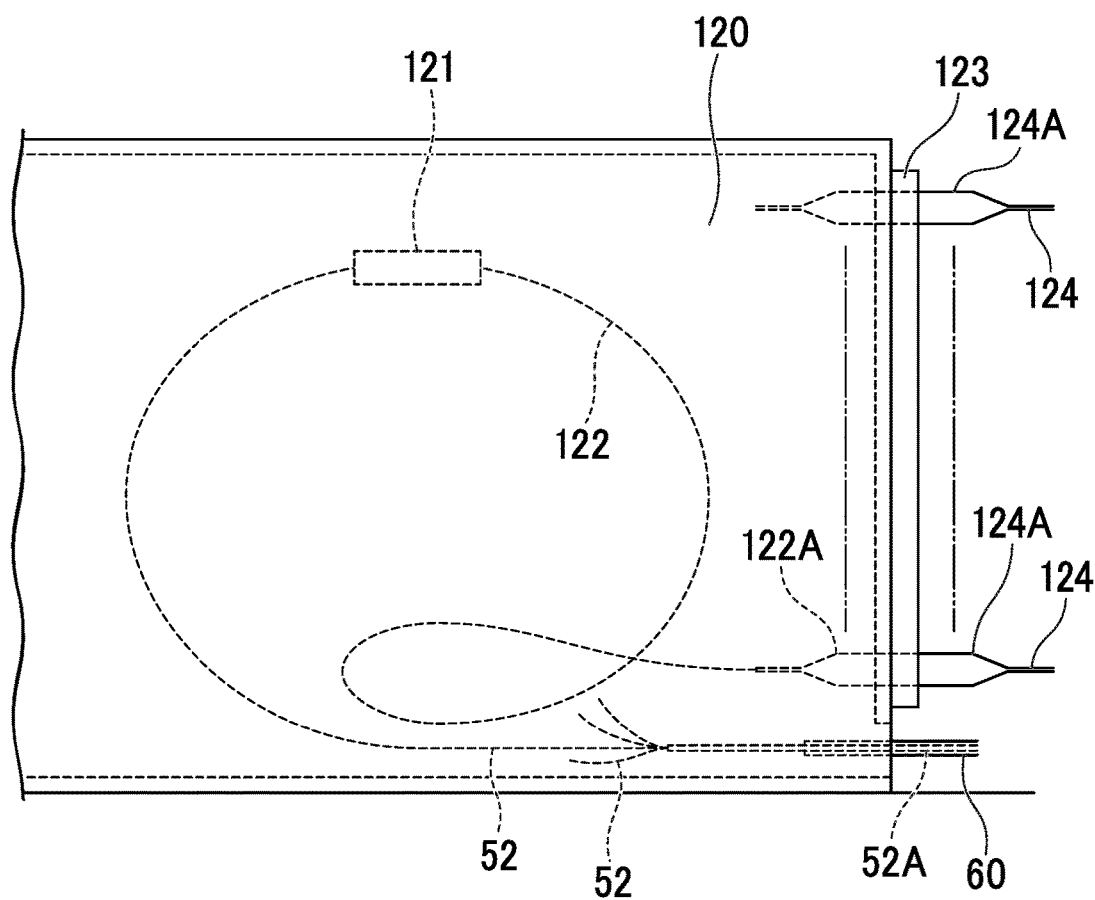
FIG. 17 is a side view of the fusion tray in accordance with one or more embodiments.

As shown in FIG. 16, the intermittently-fixed core 52A (optical fibers 52) taken out from the second branch case 2 is introduced into a fusion tray 120 placed on a rack 110. A plurality of the fusion trays 120 is juxtaposed on the rack 110. As shown in FIG. 17, the intermittently-fixed core 52A is introduced into the fusion tray 120 together with the protective tube 60.

The protective tube 60 is detached from the intermittently-fixed core 52A in the fusion tray 120. The intermittently-fixed core 52A detached from the protective tube 60 is unbound into the optical fibers 52. The optical fibers 52 are connected to a connection optical fiber 122 which is another optical fiber in the fusion connecting portion 121.

An optical connector adapter 123 is disposed at a rear end portion of the fusion tray 120. In the optical connector adapter 123, a connector port through which an optical connector can be inserted and removed is disposed on each of an inner side and an outer side of the fusion tray 120. On the inner side and the outer side of the fusion tray 120, optical connectors are disposed in pairs.

One end side of the connection optical fiber 122 is connected to the fusion connecting portion 121. An optical connector 122A is disposed on the other end side of the connection optical fiber 122. The optical connector 122A is fitted into an adapter port of the optical connector adapter 123 disposed in the fusion tray 120. An external optical connector 124A of an external optical fiber 124 is fitted into an adapter port of the optical connector adapter 123 disposed outside the fusion tray 120. At the adapter port of the optical connector adapter 123, the optical connector 122A of the connection optical fiber 122 and the external optical connector 124A of the external optical fiber 124 are disposed so as to face each other. In this manner, the connection optical fiber 122 and the external optical fiber 124 are connector-connected (optically connected) to each other. An object to be introduced into the fusion tray 120 is not limited to the intermittently-fixed core 52A but may be an optical fiber core bundle such as the optical fiber unit 51 or the optical fibers 52 or the like.

A frame 130 of the rack 110 includes a plate member 140, and the first branch case 1 of the optical fiber-cable branch structure 100 is attached to the plate member 140. The plate member 140 is disposed in an upper portion of the rack 110. When the first branch case 1 is attached to the plate member 140, a joining member such as a bolt is attached to each of the left attachment hole 32L and the right attachment hole 32R formed in the installation position attachment portion 32 of the attachment plate 30 in the first branch case 1, and the attachment plate 30 is attached to the plate member 140 with this joining member. The left attachment hole 32L and the right attachment hole 32R are disposed so as to be separated from each other by a distance longer than the diameter of the optical fiber-cable 50. Therefore, when the first branch case 1 is attached to the plate member 140, the left attachment hole 32L and the right attachment hole 32R can be disposed at positions where the optical fiber-cable 50 does not overlap therewith. Therefore, when a joining member such as a bolt is attached to each of the left attachment hole 32L and the right attachment hole 32R, it is possible to prevent the optical fiber-cable 50 from becoming an obstacle. The second branch case 2 is not attached to the frame 130 or the plate member 140 but is hung as it is. The optical fibers 52 in the optical fiber-cable 50 are branched into a small number of optical fibers 52 in the first branch case 1. Therefore, the second branch case 2 can be small and lightweight, and therefore can be easily attached in a suspended state. The plate member 140 is attached in an upper portion of the rack 110. Therefore, a sufficient space for suspending the second branch case 2 can be secured.

The first branch case 1 does not need to be attached to the plate member 140 with a joining member such as a bolt. For example, the first branch case 1 may be kept suspended, or may be attached to the frame 130 with a string or the like. The second branch case 2 may be attached to the frame 130 or the plate member 140. In a case where the plate member 140 is not disposed in the frame 130, the first branch case 1 and the second branch case 2 may be directly attached to the frame 130. The first branch case 1 and the second branch case 2 may be attached to portions of the rack 110 other than the frame 130.

The first branch case 1 branches the optical fibers 52 into a plurality of the second branch cases 2. Here, the length of each of the optical fibers 52 between the first branch case 1 and the plurality of second branch cases 2 is different for each of the second branch cases 2. By setting the length of each of the optical fibers 52 between the first branch case 1 and the plurality of second branch cases 2 to a length different for each of the second branch cases 2, concentration of the plurality of second branch cases 2 in a close range can be suppressed.

The optical fiber-cable branch structure 100 according to one or more embodiments of the present invention having the above configuration protects the optical fibers 52 in the fixing portion 13 positioned on the side opposite to the intake portion 11 in the accommodation portion 12 with the protective tube 60. Therefore, it is possible to protect the optical fibers 52 in the fixing portion 13 from disconnection or the like. The fixing plates 18 and 19 in the fixing portion 13 fix the protective tube 60. By fixing the protective tube 60 to the fixing portion 13, the optical fibers 52 can be brought into a stable state. Therefore, it is possible to suppress a decrease in workability when optical fibers are branched.

When the optical fibers 52 are fixed, it is only necessary to insert the protective tube 60 having a small change in shape into the fixing grooves 18A to 18F, 19A, and 19B of the fixing plates 18 and 19, and time and labor involved in the work is small. Therefore, workability can be further improved. The protective tube 60 can be fixed in a stable posture, and therefore the branched optical fibers 52 can be maintained in a stable posture.

By disposing the branch cases 1 and 2, it is possible to easily adjust the length of the optical fiber-cable 50 at the site. Therefore, occurrence of extra lengths of the optical fibers 52 can be suppressed. Therefore, it is possible to reduce labor of extra length processing of an optical fiber core. Particularly, by disposing the branch cases in a plurality of stages, it is possible to more easily adjust the length of the optical fiber-cable 50.

The comb-shaped fixing plates 18 and 19 are disposed between the second partition member 13D and the third partition member 13E and between the third partition member 13E and the fourth partition member 13F in the fixing portion 13, respectively. Therefore, the protective tube 60 can be fixed via the fixing plates 18 and 19, and therefore it is possible to fix the plurality of protective tubes 60 collectively. Therefore, an increase in the number of components can be suppressed.

An insert ring 61 is inserted into an end portion of the protective tube 60 disposed in the fixing portion 13. In the insert ring 61, the tubular portion 61A and the ring portion 61B having a larger diameter than the tubular portion 61A are formed. Therefore, collapse of the protective tube 60 in the fixing portion 13 is suppressed, and therefore the protective tube 60 can be more securely fixed by the partition members 13C to 13F. Specifically, in the protective tube 60 not having the insert ring 61 disposed, the protective tube 60 was pulled out with a light force. Meanwhile, by disposing the insert ring 61, it was impossible to pull out the protective tube 60 even with a force of about seven times the force with which the protective tube 60 was pulled out in a case where the insert ring 61 was not disposed.

In the intake portion 11, the jacket 55 of the optical fiber-cable 50 is sandwiched and held by the cable receiving recessed groove 11B of the intake portion 11 and the holding member main body 15A of the holding member 15. Therefore, even in the intake portion 11 of the first branch case 1, the optical fibers 52 can be maintained in a stable posture. Particularly, the optical fiber unit 51 included in the optical fiber-cable 50 is an SWR, and the tension-resisting members 56 is disposed in the jacket 55. Since the tension-resisting member 56 is disposed, by fastening the jacket 55 with the metal holding member 15, the optical fiber-cable 50 can be fixed with the simple holding member 15.

The jacket 55 of the optical fiber-cable 50 is fitted into the cable receiving recessed groove 11B of the intake portion 11. The holding member 15 fixes the jacket 55 of the optical fiber-cable 50 fitted into the cable receiving recessed groove 11B. Therefore, the jacket 55 of the optical fiber-cable 50 and the optical fibers 52 included in the jacket 55 can be securely fixed.

The crescent-shaped protrusion 11E is formed in the cable receiving recessed groove 11B. The crescent-shaped protrusion 11E is formed such that a longitudinal direction thereof intersects with an extending direction of the optical fiber-cable 50, and therefore can suitably suppress movement of the optical fiber-cable 50 in the extending direction of the optical fiber-cable 50.

It is difficult to suppress the movement of the optical fiber-cable 50 in a direction along a circular arc of the cable receiving recessed groove 11B only with the crescent-shaped protrusion 11E. In this point, the rasp-cut protrusion 11D is disposed between the crescent-shaped protrusions 11E. Due to this rasp-cut protrusion 11D, the movement of the optical fiber-cable 50 in the direction along the circular arc of the cable receiving recessed groove 11B can be suitably suppressed.

A notch portion 15D is formed in the holding member 15. The notch portion 15D bites into the jacket 55 while the cable receiving recessed groove 11B and the holding member 15 hold the jacket 55. Therefore, the jacket 55 of the optical fiber-cable 50 and the optical fibers 52 included in the jacket 55 can be more securely fixed. The notch portion 15D is disposed at upper and lower ends of the holding member main body 15A. Therefore, the movement of the optical fiber-cable 50 can be suitably suppressed in both a pushing-in direction and a pulling-out direction of the optical fiber-cable 50 with respect to the first branch case 1.

A resin material is filled in the accommodation portion 12. Therefore, movement of the optical fibers 52 in the accommodation portion 12 is prevented, and the optical fibers 52 can be securely fixed. Therefore, the optical fibers 52 can be maintained in a stable posture. The first injection hole 21H1 and the second injection hole 21H2 into which a resin material is injected are formed in the accommodation portion 12. The first injection hole 21H1 and the second injection hole 21H2 are disposed apart from each other in an extending direction of the protective tube 60. Therefore, when the first branch case 1 is disposed in the attachment posture shown in FIG. 16, first, by filling a resin material in the accommodation portion 12 from the lower second injection hole 21H2, the resin material can be securely filled even in lower corners of the accommodation portion 12. When filling of the resin material in the accommodation portion 12 advances and the resin material is filled up to the height position of the second injection hole 21H2, filling of the resin material from the second injection hole 21H2 cannot be performed. At this time, by filling the resin material from the upper first injection hole 21H1, the resin material can be filled up to a high position of the accommodation portion 12.

The left surplus space 12LS and the right surplus space 12RS are formed on an upper side of the accommodation portion 12. Therefore, the volume of the accommodation portion 12 can be prevented from becoming too large. Therefore, it is possible to prevent a resin material filled in the accommodation portion 12 from becoming too much. The surplus spaces 12LS and 12RS may be formed in other forms. For example, a surplus space may be formed on one of the left and right sides, or a surplus space may be formed on a side closer to the fixing portion 13 than the accommodation portion 12.

The stopper 17 which prevents leakage of a liquid resin material is disposed in the fixing portion 13, and the protective tube 60 extending from the accommodation portion 12 is inserted into the stopper 17. By disposing the stopper 17, leakage of the resin material from the fixing portion 13 can be suppressed when the liquid resin material is filled in a state in which the intake portion 11 is disposed above and the fixing portion 13 is disposed below.

The second branch case 2 is disposed together with the first branch case 1 to branch the optical fibers in two stages. Therefore, the plurality of optical fibers 52 included in the optical fiber-cable 50 is branched in a plurality of stages, and therefore the branching amount in one step can be reduced. Therefore, it is possible to suppress an increase in size of the branch case.

The number of branches of the optical fibers 52 in the second branch case 2 is smaller than the number of branches of the optical fibers 52 in the first branch case 1. Specifically, the first branch case 1 branches the optical fibers 52 into 12 sets, and the second branch case 2 branches the optical fibers 52 into two sets. Therefore, the branching pattern of the optical fibers can be formed into various patterns near the fusion tray 120.

The left ridge portions 21LA and 21LB and the right ridge portions 21RA and 21RB are disposed in the first branch case lid member 20 in the first branch case 1. When the first branch case lid member 20 is attached to the first branch case main body 10, the left ridge portions 21LA and 21LB are disposed at positions sandwiching an upper edge of the left surplus space forming wall portion 12C of the first branch case main body 10. Similarly, the right ridge portions 21RA and 21RB are disposed at positions sandwiching an upper edge of the right surplus space forming wall portion 12D of the first branch case main body 10. Therefore, the liquid resin material can close a gap between the first branch case main body 10 and the first branch case lid member 20 in the accommodation portion 12 with the surplus space forming wall portions 12C and 12D and the ridge portions 21LA, 21LB, 21RA, and 21RB in a liquid-tight manner. Therefore, leakage of a filler from the gap between the first branch case main body 10 and the first branch case lid member 20 can be suppressed when the liquid resin material is filled.

In a case where the optical fiber-cable branch member 101 is connected to the fusion tray as described above, the optical fiber-cable branch member 210 is often attached in an exposed state. In this case, the optical fibers 52 between the intake portion 11 and the fixing portion 13 are covered with the first branch case 1 or the like.

According to one or more embodiments as described above, the optical fiber-cable branch member 210 is disposed, for example, in a closure. Therefore, the optical fibers 52 between the cable fixing portion 212 and the tube fixing portion 213 are not covered with a case or the like but may be covered with the case or the like. In a case where the optical fiber-cable branch member 210 is connected to the fusion tray or the like, even if the optical fibers 52 between the cable fixing portion 212 and the tube fixing portion 213 are exposed as described above, it is not necessary to cover the optical fibers 52 between the cable fixing portion 212 and the tube fixing portion 213 with a case or the like.

Particularly, even in a case where the optical fiber-cable branch member 101 is not disposed in a case such as a closure or an optical termination box, if the optical fiber-cable branch member 101 is used indoors or the like, the optical fibers 52 between the intake portion 11 and the fixing portion 13 may be exposed. Even in a case where the optical fiber-cable branch member 101 is accommodated in a case such as a closure, if a member which may damage the optical fibers 52 due to vibrations or the like is disposed in the vicinity thereof, the optical fibers 52 between the cable fixing portion 212 and the tube fixing portion 213 may be covered with a case or the like.

DESCRIPTION OF THE REFERENCE SYMBOLS

1: First branch case
2: Second branch case
10: Branch case main body
11: Intake portion
11A: Intake portion main body
11B: Cable receiving recessed groove
11C: Cut portion
11D: Rasp-cut protrusion
11E: Crescent-shaped protrusion
12: Accommodation portion
12C, 12D: Surplus space forming wall portion
12LS, 12RS: Surplus space
12S: Optical fiber accommodation portion
13: Fixing portion
13C, 13D, 13E, 13F: Partition member
13C1 to 13C5: First partition column member
13C6: First connecting member
13CH1: First partition first recess
14: Take-out portion
15: Holding member
15A: Holding member main body
15B: Fastening portion
15D: Notch portion
17: Stopper
17A, 17B: Cut portion
17A1, 17A2, 17B1, 17B2: Positioning hole
18, 19: Fixing plate
18A to 18F, 19A to 19F: Fixing groove
20: Branch case lid member
21H1: First injection hole
21H2: Second injection hole
21LA, 21LB, 21RA, 21RB: Ridge portion
21U1 to 21U6: Protective tube receiving portion
50: Optical fiber-cable
51: Optical fiber unit
52: Optical fiber
55: Jacket
56: Tension-resisting member
60: Protective tube
61: Insert ring
61A: Tubular portion
61B: Ring portion
100, 200: Optical fiber-cable branch structure
101, 210: Optical fiber-cable branch member
211: Branch member main body
212: Cable fixing portion
213: Tube fixing portion
214: Branch portion Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber-cable branch member comprising:
a branch member main body;
a cable fixing portion that holds and fixes an end portion of a jacket of an optical fiber-cable onto the branch member main body, wherein
the optical fiber-cable comprises a first optical fiber core bundle and the jacket, and
the jacket coats an outer circumference of the first optical fiber core bundle and comprises a tension-resisting member buried in a cable longitudinal direction; and
a tube fixing portion that:
comprises slits that hold a detachable fixing plate; and
fixes a plurality of protective tubes onto the branch member main body by the detachable fixing plate, wherein
the detachable fixing plate:
has a comb shape in which a plurality of fixing grooves is formed, wherein the protective tubes are respectively inserted into the fixing grooves; and
penetrates into walls of the protective tubes in a direction perpendicular to a longitudinal direction of the protective tubes,
wherein the plurality of protective tubes covers and protect respective outer circumferences of a plurality of second optical fiber core bundles obtained by branching the first optical fiber core bundle extending from the end portion of the jacket.

2. The optical fiber-cable branch member according to claim 1, wherein the branch member main body comprises a protective case that protects an optical fiber core disposed between the cable fixing portion and the tube fixing portion.

3. The optical fiber-cable branch member according to claim 2, wherein a resin material, filled in an internal space of the protective case where the optical fiber core is disposed, prevents movement of the optical fiber core in the protective case.

4. The optical fiber-cable branch member according to claim 3, wherein
the protective case comprises an injection hole, and
the resin material is injected into the injected hole.

5. An optical fiber-cable branch structure comprising:
an optical fiber-cable comprising a first optical fiber core bundle and a jacket,
wherein the jacket coats an outer circumference of the first optical fiber core bundle and comprises a tension-resisting member buried in a cable longitudinal direction;
a first optical fiber-cable branch member that branches the first optical fiber core bundle extending from an end portion of the jacket into a plurality of second optical fiber core bundles, wherein the plurality of second optical fiber core bundles are branched by the first optical fiber-cable branch member; and
a plurality of protective tubes that cover and protect respective outer circumferences of the plurality of second optical fiber core bundles,
wherein the first optical fiber-cable branch member comprises:
a branch member main body;
a cable fixing portion that holds and fixes the end portion of the jacket of the optical fiber-cable onto the branch member main body; and
a tube fixing portion that:
comprises slits that hold a detachable fixing plate; and
fixes the plurality of protective tubes onto the branch member main body by the detachable fixing plate, wherein
the detachable fixing plate:
has a comb shape in which a plurality of fixing grooves is formed, wherein the protective tubes are respectively inserted into the fixing grooves, and
penetrates into walls of the protective tubes in a direction perpendicular to a longitudinal direction of the protective tubes,
wherein the plurality of protective tubes protects the plurality of second optical fiber core bundles obtained by branching the first optical fiber core bundle.

6. The optical fiber-cable branch structure according to claim 5, further comprising a second optical fiber-cable branch member that branches at least one of the plurality of second optical fiber core bundles branched by the first optical fiber-cable branch member into a plurality of third optical fiber core bundles.

7. The optical fiber-cable branch structure according to claim 5, wherein
each of the protective tubes has a circular cross section, and
the second optical fiber core bundles and the protective tubes are bendable in any direction perpendicular to the longitudinal direction of the protective tubes.

8. The optical fiber-cable branch structure according to claim 5, wherein
the first optical fiber core bundle is constituted by a plurality of optical fiber units as an aggregate of optical fiber cores, wherein each of the optical fiber units is obtained by bundling a plurality of optical fiber cores with a bundling member, and
the first optical fiber-cable branch member branches the first optical fiber core bundle into the plurality of second optical fiber core bundles, each constituted by one or more of the optical fiber units.

9. The optical fiber-cable branch structure according to claim 8, wherein the protective tubes are transparent or translucent.

10. The optical fiber-cable branch structure according to claim 5, wherein
the branch member main body further comprises a protective case that protects an optical fiber core disposed between the cable fixing portion and the tube fixing portion.

11. The optical fiber-cable branch structure according to claim 10, wherein a resin material, filled in an internal space of the protective case where the optical fiber core is disposed, prevents movement of the optical fiber core in the protective case.

12. The optical fiber-cable branch structure according to claim 11, wherein
the protective case comprises an injection hole, and
the resin material is injected into the injected hole.

13. The optical fiber-cable branch structure according to claim 5, wherein the optical fiber-cable branch structure further comprises a shape retaining member inserted into each of the protective tubes.

* * * * *